United States Patent
Ihata

(10) Patent No.: US 8,487,071 B2
(45) Date of Patent: Jul. 16, 2013

(54) POLYETHER POLYMER AND PRODUCTION PROCESS THEREOF

(75) Inventor: Osamu Ihata, Chiba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 159 days.

(21) Appl. No.: 12/993,179

(22) PCT Filed: Apr. 17, 2009

(86) PCT No.: PCT/JP2009/058114
§ 371 (c)(1),
(2), (4) Date: Nov. 17, 2010

(87) PCT Pub. No.: WO2009/142094
PCT Pub. Date: Nov. 26, 2009

(65) Prior Publication Data
US 2011/0065889 A1    Mar. 17, 2011

(30) Foreign Application Priority Data
May 20, 2008   (JP) ................. 2008-132175

(51) Int. Cl.
*C08G 65/34*   (2006.01)
*C08G 65/00*   (2006.01)
*C08F 6/00*    (2006.01)
*C08J 3/00*    (2006.01)

(52) U.S. Cl.
USPC ............ 528/425; 528/392; 528/396; 528/486

(58) Field of Classification Search
USPC ................. 528/425, 392, 396, 486
See application file for complete search history.

(56) References Cited

U.S. PATENT DOCUMENTS
3,404,102 A    10/1968   Starcher et al.
4,908,406 A    3/1990    Muelhaupt et al.

FOREIGN PATENT DOCUMENTS
EP    0 648 810 A1    4/1995
JP    2005-248154 A   9/2005
JP    2007-211138 A   8/2007

OTHER PUBLICATIONS

Robert T. Mathers et al, "A General polymerization Method Using Hydroalkoxylation and Hydrocarboxylation Reactions Catalyzed by Triflic Acid," Macromolecules, vol. 41, pp. 524-526, (2008).
Int'l Search Report issued on Oct. 1, 2009 in Int'l Application No. PCT/JP2009/058114.
Matejkal, et al., "Cationic Polymerization of Diglycidyl Ether of Bisphenol A", Journal of Polymer Science: Part A: Polymer Chemistry, vol. 32, pp. 1447-1458 (1994).

*Primary Examiner* — Duc Truong
(74) *Attorney, Agent, or Firm* — Panitch Schwarze Belisario & Nadel LLP

(57) ABSTRACT

A polyether polymer containing a defined polymerization unit ($-R^1-O-R^2-O-$), $R^1$ and $R^2$ being derived from monomers (A) and (B), respectively; and a process for producing the polyether polymer comprising the step of copolymerizing the monomer (A) with the monomer (B) in the presence of a metal salt, wherein the monomer (A) is (A1) a non-conjugated mono-cyclic diene compound containing a cyclic skeleton, or (A2) a non-conjugated cyclic diene compound containing a mutual linking of plurality of a monocyclic structure having a cyclic skeleton, and the monomer (B) is an aliphatic diol, an alicyclic diol or a divalent phenol.

10 Claims, No Drawings

POLYETHER POLYMER AND PRODUCTION PROCESS THEREOF

TECHNICAL FIELD

The present invention relates to a polyether polymer, and a process for producing a polyether polymer.

BACKGROUND ART

A polyether polymer can be defined as a polymer containing ether bonds in its repeating units. There are known many polyether polymers having various characteristics, such as a polyether ether ketone known as an industrial material, and polyethylene glycol (see KOBUNSHI DAIJITEN, page 1038, published by MARUZEN Co., LTD. Sep. 20, 1994; "KOBUNSHI DAIJITEN" means "POLYMER COMPREHENSIVE DICTIONARY").

There are known polyphenylene ethers as a polyether polymer containing ether bonds and aromatic ring structures. Poly (2,6-dimethyl-1,4-phenylene ether), which is an example of the polyphenylene ethers, has a good thermal property such as good ductibility even at a lower temperature than its Tg, and high impact resistance even at −200° C. or lower, and is a good physical property-carrying material having good ductibility, high strength, and high heat distortion temperature (see KOBUNSHI DAIJITEN, page 1067, published by MARUZEN Co., LTD. Sep. 20, 1994).

DISCLOSURE OF INVENTION

However, in order to produce the above conventional polyether polymers containing ether bonds and aromatic ring structures, it is necessary to design carefully reactive monomers used for producing the above conventional polyether polymers, and then synthesize precisely those reactive monomers. Therefore, there have been desired polyether polymers, which can be produced according to an effective production process, and contain both ether bonds and new structures, and have new properties and functions.

In view of the above circumstances, an object of the present invention is to provide a polyether polymer comprising new polymerization units as defined below, and a production process thereof.

The present invention is a polyether polymer comprising polymerization units represented by the following formula [1]:

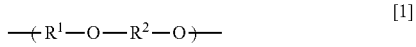

[1]

wherein, regarding $R^1$, (1) $R^1$ is a group of a mono-cyclic structure having a cyclic skeleton containing 6 to 20 atoms, two or more of which are carbon atoms, or is a group of a structure formed by a mutual linking of plurality of a mono-cyclic structure having a cyclic skeleton containing 3 to 20 atoms, two or more of which are carbon atoms, (2) two carbon atoms, which are contained in one or more of the cyclic skeletons of $R^1$, and do not exist next to each other, make a bond to an oxygen atom of an ether bond in a main chain next to $R^1$, respectively, (3) when an oxygen atom exists in one or more of the cyclic skeletons of $R^1$, said oxygen atom makes no bond to any of the above two carbon atoms mentioned in (2), and (4) two atoms, which are contained in one or more of the cyclic skeletons of $R^1$, and do not exist next to each other, may make a bond to each other directly or through an atom or an atomic group; and $R^2$ is an aliphatic hydrocarbyl group having 2 to 20 carbon atoms; an alicyclic hydrocarbyl group having 4 to 20 carbon atoms, or an aromatic hydrocarbyl group having 6 to 30 carbon atoms, excluding a 2,2-diphenylpropane-4,4'-diyl group.

Also, the present invention is a process for producing a polyether polymer comprising polymerization units represented by the above formula [1], comprising the step of copolymerizing one or more kinds of the following monomer (A) with one or more kinds of the following monomer (B) in the presence of a metal salt:

(A) a non-conjugated mono-cyclic diene compound (A1) containing a cyclic skeleton containing 6 to 20 atoms, two or more of which are carbon atoms, and/or a non-conjugated cyclic diene compound (A2) containing a mutual linking of plurality of a mono-cyclic structure having a cyclic skeleton containing 3 to 20 atoms, two or more of which are carbon atoms; and (B) one or more kinds of compounds selected from the group consisting of an aliphatic diol having 2 to 20 carbon atoms, two of which carbon atoms have a hydroxyl group, respectively, an alicyclic diol having 3 to 20 carbon atoms, and a divalent phenol.

BEST MODE FOR CARRYING OUT THE INVENTION

Examples of $R^1$ in the formula [1] are groups of a mono-cyclic structure such as a 1,3-cyclohexylene group, a 1,4-cyclohexylene group, a 1,3-cyclooctylene group, a 1,4-cyclooctylene group, a 1,5-cyclooctylene group, a 1,3-cyclodecylene group, a 1,4-cyclodecylene group, a 1,5-cyclodecylene group, a 1,6-cyclodecylene group, a 1,3-cyclododecylene group, a 1,4-cyclododecylene group, a 1,5-cyclododecylene group, a 1,6-cyclododecylene group, a 1,7-cyclododecylene group, a 1,3-cyclotetradecylene group, a 1,4-cyclotetradecylene group, a 1,5-cyclotetradecylene group, a 1,6-cyclotetradecylene group, a 1,7-cyclotetradecylene group, a 1,8-cyclotetradecylene group, a 1,3-cyclohexadecylene group, a 1,4-cyclohexadecylene group, a 1,5-cyclohexadecylene group, a 1,6-cyclohexadecylene group, a 1,7-cyclohexadecylene group, a 1,8-cyclohexadecylene group, a 1,9-cyclohexadecylene group, a 1,3-cyclooctadecylene group, a 1,4-cyclooctadecylene group, a 1,5-cyclooctadecylene group, a 1,6-cyclooctadecylene group, a 1,7-cyclooctadecylene group, a 1,8-cyclooctadecylene group, a 1,9-cyclooctadecylene group, a 1,10-cyclooctadecylene group, a 1,3-cycloeicosylene group, a 1,4-cycloeicosylene group, a 1,5-cycloeicosylene group, a 1,6-cycloeicosylene group, a 1,7-cycloeicosylene group, a 1,8-cycloeicosylene group, a 1,9-cycloeicosylene group, a 1,10-cycloeicosylene group, a 1,11-cycloeicosylene group, a 2-methyl-1,4-cyclohexylene group, a 2-ethyl-1,4-cyclohexylene group, a 2-propyl-1,4-cyclohexylene group, a 2-butyl-1,4-cyclohexylene group, a 2-pentyl-1,4-cyclohexylene group, 2-hexyl-1,4-cyclohexylene group, a 2-heptyl-1,4-cyclohexylene group, 2-octyl-1,4-cyclohexylene group, 2-nonyl-1,4-cyclohexylene group, 2-decyl-1,4-cyclohexylene group, 2-(tert-butyl)-1,4-cyclohexylene group, 2,5-dimethyl-1,4-cyclohexylene group, 2,5-diethyl-1,4-cyclohexylene group, 2,5-dipropyl-1,4-cyclohexylene group, 2,5-dibutyl-1,4-cyclohexylene group, 2,5-dipentyl-1,4-cyclohexylene group, 2,5-dihexyl-1,4-cyclohexylene group, 2,5-diheptyl-1,4-cyclohexylene group, 2,5-dinonyl-1,4-cyclohexylene group, a 2,5-didecyl-1,4-cyclohexylene group, a 2,5-bis(tert-butyl)-1,4-cyclohexylene group, a 2-fluoromethyl-1,4-cyclohexylene group, a 2-difluoromethyl-1,4-cyclohexylene group, a 2-trifluoromethyl-1,4-cyclohexylene group, a 2-chloromethyl-1,4-cyclohexylene group, a 2-dichloromethyl-1,4-cyclohexylene group, a 2-trichloromethyl-1,4-cyclohexylene group, a 2-bromomethyl-1,4-cyclohexylene group, a 2-dibromomethyl-1,4-cyclohexylene group, a 2-tribromomethyl-1,4-cyclohexylene group, a 2,5-bis(fluoromethyl)-1,4-cyclohexylene group, a 2,5-bis(difluoromethyl)-1,4-cyclohexylene group, a 2,5-bis(trifluoromethyl)-1,4-cyclohexylene group, a 2,5-bis(chloromethyl)-1,4-cyclohexylene group, a 2,5-bis(dichloromethyl)-1,4-cyclohexylene group, a 2,5-bis(trichloromethyl)-1,4-cyclohexylene group, a 2,5-bis(bromomethyl)-1,4-cyclohexylene group, a 2,5-bis(dibromomethyl)-1,4-cyclohexylene group, a 2,5-bis(tribromomethyl)-1,4-cyclohexylene group, a 2-(1-fluoroethyl)-1,4-cyclohexylene group, a 2-(2-fluoroethyl)-1,4-cyclohexylene group, a 2-(1,2-difluoroethyl)-1,4-cyclohexylene group, a 2-(1-fluorobutyl)-1,4-cyclohexylene group, a 2-(2-fluorobutyl)-1,4-cyclohexylene group, a 2-(1,2,3,4-tetrafluorobutyl)-1,4-cyclohexylene group, a 2-(1,1,2,2,3,3,4,4,4-decafluorobutyl)-1,4-cyclohexylene group, a 2-(1-chloroethyl)-1,4-cyclohexylene group, a 2-(2-chloroethyl)-1,4-cyclohexylene group, a 2-(1,2-dichloroethyl)-1,4-cyclohexylene group, a 2-(1,1,2,2,2-pentachloroethyl)-1,4-cyclohexylene group, a 2-(1-chlorobutyl)-1,4-cyclohexylene group, a 2-(2-chlorobutyl)-1,4-cyclohexylene group, a 2-(1,2,3,4-tetrachlorobutyl)-1,4-cyclohexylene group, a 2-(1,1,2,2,3,3,4,4,4-decachlorobutyl)-1,4-cyclohexylene group, a 2-(1-bromoethyl)-1,4-cyclohexylene group, a 2-(2-bromoethyl)-1,4-cyclohexylene group, a 2-(1,2-dibromoethyl)-1,4-cyclohexylene group, a 2-(1,1,2,2,2-pentabromoethyl)-1,4-cyclohexylene group, a 2-(1-bromobutyl)-1,4-cyclohexylene group, a 2-(2-bromobutyl)-1,4-cyclohexylene group, a 2-(1,2,3,4-tetrabromobutyl)-1,4-cyclohexylene group, a 2-(1,1,2,2,3,3,4,4,4-decabromobutyl)-1,4-cyclohexylene group, a 2,5-bis(1-fluoroethyl)-1,4-cyclohexylene group, a 2,5-bis(2-fluoroethyl)-1,4-cyclohexylene group, a 2,5-bis(1,2-difluoroethyl)-1,4-cyclohexylene group, a 2,5-bis(1-fluorobutyl)-1,4-cyclohexylene group, a 2,5-bis(2-fluorobutyl)-1,4-cyclohexylene group, a 2,5-bis(1,2,3,4-tetrafluorobutyl)-1,4-cyclohexylene group, a, 5-bis(1,1,2,2,3,3,4,4,4-decafluorobutyl)-1,4-cyclohexylene group, a 2,5-bis(1-chloroethyl)-1,4-cyclohexylene group, a 2,5-bis(2-chloroethyl)-1,4-cyclohexylene group, a 2,5-bis(1,2-dichloroethyl)-1,4-cyclohexylene group, a 2,5-bis(1,1,2,2,2-pentachloroethyl)-1,4-cyclohexylene group, a 2,5-bis(1-chlorobutyl)-1,4-cyclohexylene group, a 2,5-bis(2-chlorobutyl)-1,4-cyclohexylene group, a 2,5-bis(1,2,3,4-tetrachlorobutyl)-1,4-cyclohexylene group, a, 5-bis(1,1,2,2,3,3,4,4,4-decachlorobutyl)-1,4-cyclohexylene group, a 2,5-bis(1-bromoethyl)-1,4-cyclohexylene group, a 2,5-bis(2-bromoethyl)-1,4-cyclohexylene group, a 2,5-bis(1,2-dibromoethyl)-1,4-cyclohexylene group, a 2,5-bis(1,1,2,2,2-pentabromoethyl)-1,4-cyclohexylene group, a 2,5-bis(1-bromobutyl)-1,4-cyclohexylene group, a 2,5-bis(2-bromobutyl)-1,4-cyclohexylene group, a 2,5-bis(1,2,3,4-tetrabromobutyl)-1,4-cyclohexylene group, a 2,5-bis(1,1,2,2,3,3,4,4,4-decabromobutyl)-1,4-cyclohexylene group, a 2-phenyl-1,4-cyclohexylene group, a 2,5-diphenyl-1,4-cyclohexylene group, a 2-benzyl-1,4-cyclohexylene group, a 2,5-dibenzyl-1,4-cyclohexylene group, a 2-(4-methylphenyl)-1,4-cyclohexylene group, a 2,5-bis(4-methylphenyl)-1,4-cyclohexylene group, a 2-methoxy-1,4-cyclohexylene group, a 2-ethoxy-1,4-cyclohexylene group, a 2-butoxy-1,4-cyclohexylene group, 2-pentoxy-1,4-cyclohexylene group, 2-hexyloxy-1,4-cyclohexylene group, 2-heptyloxy-1,4-cyclohexylene group, 2-octyloxy-1,4-cyclohexylene group, 2-nonyloxy-1,4-cyclohexylene group, 2-decyloxy-1,4-cyclohexylene group, 2-(tert-butoxy)-1,4-cyclohexylene group, 2,5-bis(methoxy)-1,4-cyclohexylene group, 2,5-bis(ethoxy)-1,4-cyclohexylene group, 2,5-bis(propoxy)-1,4-cyclohexylene group, 2,5-bis(butoxy)-1,4-cyclohexylene group, 2,5-bis(pentoxy)-1,4-cyclohexylene group, 2,5-bis(hexyloxy)-1,4-cyclohexylene group, 2,5-bis(heptyloxy)-1,4-cyclohexylene group, 2,5-bis(octyloxy)-1,4-cyclohexylene group, 2,5-bis(nonyloxy)-1,4-cyclohexylene group, 2,5-bis(decyloxy)-1,4-cyclohexylene group, 2,5-bis(tert-butoxy)-1,4-cyclohexylene group, 2-methylthio-1,4-cyclohexylene group, 2-ethylthio-1,4-cyclohexylene group, 2-propylthio-1,4-cyclohexylene group, 2-butylthio-1,4-cyclohexylene group, 2-pentylthio-1,4-cyclohexylene group, 2-hexylthio-1,4-cyclohexylene group, 2-octylthio-1,4-cyclohexylene group, a 2-nonylthio-1,4-cyclohexylene group, a 2-decylthio-1,4-cyclohexylene group, a 2-(tert-butylthio)-1,4-cyclohexylene group, a 2,5-bis(methylthio)-1,4-cyclohexylene group, a 2,5-bis(ethylthio)-1,4-cyclohexylene group, a 2,5-bis(propylthio)-1,4-cyclohexylene group, a 2,5-bis(butylthio)-1,4-cyclohexylene group, a 2,5-bis(pentylthio)-1,4-cyclohexylene group, a 2,5-bis(hexylthio)-1,4-cyclohexylene group, a 2,5-bis(heptylthio)-1,4-cyclohexylene group, a 2,5-bis(octylthio)-1,4-cyclohexylene group, a 2,5-bis(nonylthio)-1,4-cyclohexylene group, a 2,5-bis(decylthio)-1,4-cyclohexylene group, a 2,5-bis(tert-butylthio)-1,4-cyclohexylene group, a 2-phenylthio-1,4-cyclohexylene group, a 2,5-bis(phenylthio)-1,4-cyclohexylene group, a 2-(4-methylphenylthio)-1,4-cyclohexylene group, a 2,5-bis(4-methylphenylthio)-1,4-cyclohexylene group, a 2-nitro-1,4-cyclohexylene group, a 2,5-dinitro-1,4-cyclohexylene group, a 2-cyano-1,4-cyclohexylene group, a 2,5-dicyano-1,4-cyclohexylene group, a 2-fluoro-1,4-cyclohexylene group, a 2,5-difluoro-1,4-cyclohexylene group, a 2,5-dichloro-1,4-cyclohexylene group, a 2-bromo-1,4-cyclohexylene group, a 2,5-dibromo-1,4-cyclohexylene group, a 2-methylsilyl-1,4-cyclohexylene group, a 2-ethylsilyl-1,4-cyclohexylene group, a 2-propylsilyl-1,4-cyclohexylene group, a 2-butylsilyl-1,4-cyclohexylene group, a 2-pentylsilyl-1,4-cyclohexylene group, a 2-hexylsilyl-1,4-cyclohexylene group, a 2-heptylsilyl-1,4-cyclohexylene group, a 2-octylsilyl-1,4-cyclohexylene group, a 2-nonylsilyl-1,4-cyclohexylene group, a 2-decylsilyl-1,4-cyclohexylene group, a 2-(tert-butylsilyl)-1,4-cyclohexylene group, a 2,5-bis(methylsilyl)-1,4-cyclohexylene group, a 2,5-bis(ethylsilyl)-1,4-cyclohexylene group, a 2,5-bis(propylsilyl)-1,4-cyclohexylene group, a 2,5-bis(butylsilyl)-1,4-cyclohexylene group, a 2,5-bis(pentylsilyl)-1,4-cyclohexylene group, a 2,5-bis(hexylsilyl)-1,4-cyclohexylene group, a 2,5-bis(heptylsilyl)-1,4-cyclohexylene group, a 2,5-bis(octylsilyl)-1,4-cyclohexylene group, a 2,5-bis(nonylsilyl)-1,4-cyclohexylene group, a 2,5-bis(decylsilyl)-1,4-cyclohexylene group, a 2,5-bis(tert-butylsilyl)-1,4-cyclohexylene group, a 1-oxa-3,5-cyclohexylene group, a 1-oxa-3,7-cyclooctylene group, a 1-oxa-4,9-cyclodecylene group, a 1-oxa-5,11-cyclododecylene group, a 1-oxa-6,13-cyclotetradecylene group, a 1-oxa-7,15-cyclohexadecylene group, a 1-oxa-8,17-cyclooctadecylene group, a 1-oxa-9,19-cycloeicosylene group, a 1,6-dioxa-3,8-cyclodecylene group, a 1-thio-3,5-cyclohexylene group, a 1-thio-3,7-cyclooctylene group, a 1-thio-4,9-cyclodecylene group, a 1-thio-5,11-cyclododecylene group, a 1-thio-6,13-cyclotetradecylene group, a 1-thio-7,15-cyclohexadecylene group, a 1-thio-8,17-cyclooctadecylene group, a 1-thio-9,19-cycloeicosylene group, and a 1,6-dithio-3,8-cyclodecylene group; and groups of a structure formed by a mutual linking of plurality of a mono-cyclic structure such as a methylenebis(1,2-cyclopropylene) group, a methylenebis (1,3-cyclopentylene) group, a methylenebis(1,4-cycloheptylene) group, a methylenebis(5,1-cyclononylene) group, a methylenebis(6,1-cycloundecylene) group, a methylenebis(7,1-cyclotridecylene) group, a methylenebis(8,1-cyclopentadecylene) group, a methylenebis(9,1-cycloheptadecylene) group, a methylenebis(10,1-cyclononadecylene) group, a 1,2-ethylenebis(1,3-cyclopentylene) group, a 1,2-ethylenebis(1,4-cycloheptylene) group, a 1,2-ethylenebis(5,1-cyclononylene) group, a 1,2-ethylenebis(6,1-cycloundecylene) group, a 12-ethylenebis(7,1-cyclotridecylene) group, a 1,2-ethylenebis(8,1-cyclopentadecylene) group, a 1,2-ethylenebis(9,1-cycloheptadecylene) group, a 1,2-ethylenebis(10,1-cyclononadecylene) group, a 1,3-propylenebis(1,2-cyclopropylene) group, a 1,3-propylenebis(1,3-cyclopentylene) group, a 1,3-propylenebis(1,4-cycloheptylene) group, a 1,3-propylenebis(5,1-cyclononylene) group, a 1,3-propylenebis(6,1-cycloundecylene) group, a 1,3-propylenebis(7,1-cyclotridecylene) group, a 1,3-propylenebis(8,1-cyclopentadecylene) group, a 1,3-propylenebis(9,1-cycloheptadecylene) group, a 1,3-propylenebis(10,1-cyclononadecylene) group, a 2-methyl-1,3-propylenebis(2-cyclopropylene) group, a 2-methyl-1,3-propylenebis(1,3-cyclopentylene) group, a 2-methyl-1,3-propylenebis(1,4-cycloheptylene) group, a 2-methyl-1,3-propylenebis(5,1-cyclononylene) group, a 2-methyl-1,3-propylenebis(6,1-cycloundecylene) group, a 2-methyl-1,3-propylenebis(7,1-cyclotridecylene) group, a 2-methyl-1,3-propylenebis(8,1-cyclopentadecylene) group, a 2-methyl-1,3-propylenebis(9,1-cycloheptadecylene) group, a 2-methyl-1,3-propylenebis(10,1-cyclononadecylene) group, a 2,5-bicyclo[2.2.1]heptylene group, a 2,6-bicyclo[2.2.1]heptylene group, a 7,7-dimethyl-2,5-bicyclo[2.2.1]heptylene group, a 7,7-dichloro-2,5-bicyclo[2.2.1]heptylene group, a 2,5-bicyclo[3.2.2]nonylene group, a 2,6-bicyclo[2.2.2]nonylene group, a 2,5-bicyclo[4.3.2]undecylene group, a 2,6-bicyclo[4.3.2]undecylene group, a 2,5-bicyclo[4.4.3]tridecylene group, a 2,6-bicyclo[4.4.3]tridecylene group, a 2,5-bicyclo[5.4.4]pentadecylene group, a 2,6-bicyclo[5.4.4]pentadecylene group, a 2,5-bicyclo[5.5.5]heptadecylene group, a 2,6-bicyclo[5.5.5]heptadecylene group, a 2,5-bicyclo[6.6.5]nonadecylene group, and a 2,6-bicyclo[6.6.5]nonadecylene group. Those $R^1$ groups may have a substituent.

Examples of $R^2$ in the formula [1] are aliphatic hydrocarbyl groups such as an ethylene group, a propylene group, a butylene group, a pentylene group, a hexylene group, an octylene group, a decylene group, an undecylene group, a dodecylene group, a tridecylene group, a tetradecylene group, a pentadecylene group, a hexadecylene group, a heptadecylene group, a nonadecylene group, an eicosylene group, a 2-methylpropylene group, a 3,3-dimethylpentylene group, a 3-fluorohexylene group, a 3,3-dichlorohexylene group, a 3,4,5-tribromohexylene group, a 4-phenylheptylene group, a 4-methoxyheptylene group, a 4-ethoxycarbonyloctylene group, a 4-propylthiodecylene group, a 5-nitrododecylene group, a 7-cyanohexadecylene group, and a 8-ethylsilyloctadecylene group; alicyclic hydrocarbyl groups such as a 1,2-cyclohexylene group, a 1,3-cyclohexylene group, and a 1,4-cyclohexylene group; and aromatic hydrocarbyl groups such as a 1,2-phenylene group, a 1,3-phenylene group, a 1,4-phenylene group, a 1,2-xylylene group, a 1,3-xylylene group, and a 1,4-xylylene group. Those $R^2$ groups may have one or more substituents selected from the group consisting of a $C_{1-10}$ alkyl group, a $C_{6-18}$ aryl group, a $C_{1-10}$ alkoxy group, a $C_{1-10}$ alkoxycarbonyl group, a $C_{1-10}$ alkylthio group, a $C_{6-10}$ arylthio group, a nitro group, a cyano group, a halogen atom, and a $C_{1-10}$ alkylsilyl group. The above $C_{1-10}$ alkyl group, $C_{1-10}$ alkoxy group, $C_{1-10}$ alkoxycarbonyl group, $C_{1-10}$ alkylthio group, and $C_{1-10}$ alkylsilyl group may be substituted with a halogen atom or an aryl group.

The polyether polymer of the present invention has a primary structure, which is formed by alternate linking of a divalent group of $R^1$ with a divalent group of $R^2$ through an ether bond. Plural $R^1$s in the polyether polymer are the same as, or different from one another. Similarly, plural $R^2$s therein are the same as, or different from one another. A polyether polymer having the same plural $R^1$s as one another is obtained when using only one kind of compound as a monomer (A) mentioned hereinafter, and a polyether polymer having different plural $R^1$s from one another is obtained when using two or more kinds of compounds as the monomer (A). Similarly, a polyether polymer having the same plural $R^2$s as one another is obtained when using only one kind of compound as a monomer (B) mentioned hereinafter, and a polyether polymer having different plural $R^2$s from one another is obtained when using two or more kinds of compounds as the monomer (B).

Examples of the polyether polymer of the present invention are as follows, in addition to polyether polymers hereinafter exemplified as a preferable polyether polymer, as a more preferable polyether polymer, and as a further preferable polyether polymer:

poly(oxy-1-oxa-3,5-cyclohexylene-oxy-ethylene),
poly(oxy-1-oxa-3,5-cyclohexylene-oxy-butylene),
poly(oxy-1-oxa-3,5-cyclohexylene-oxy-hexylene),
poly(oxy-1-oxa-3,5-cyclohexylene-oxy-decylene),
poly(oxy-1-oxa-3,5-cyclohexylene-oxy-dodecylene),
poly(oxy-1-oxa-3,5-cyclohexylene-oxy-tetradecylene),
poly(oxy-1-oxa-3,5-cyclohexylene-oxy-hexadecylene),
poly(oxy-1-oxa-3,5-cyclohexylene-oxy-octadecylene),
poly(oxy-1-oxa-3,5-cyclohexylene-oxy-eicosylene),
poly(oxy-1-oxa-3,5-cyclohexylene-oxy-3,3-dimethylpentylene),
poly(oxy-1-oxa-3,5-cyclohexylene-oxy-3,3-dichlorohexylene),
poly(oxy-1-oxa-3,5-cyclohexylene-oxy-4-phenylheptylene),
poly(oxy-1-oxa-3,5-cyclohexylene-oxy-4-ethoxycarbonyloctylene),
poly(oxy-1-oxa-3,5-cyclohexylene-oxy-5-nitrododecylene),
poly(oxy-1-oxa-3,5-cyclohexylene-oxy-7-cyanohexadecylene),
poly(oxy-1-oxa-3,5-cyclohexylene-oxy-1,2-cyclohexylene),
poly(oxy-1-oxa-3,5-cyclohexylene-oxy-1,2-phenylene),
poly(oxy-1-oxa-3,5-cyclohexylene-oxy-1,3-phenylene),
poly(oxy-1-oxa-3,5-cyclohexylene-oxy-1,4-phenylene),
poly(oxy-1-oxa-3,5-cyclohexylene-oxy-1,2-xylylene),
poly(oxy-1-oxa-3,5-cyclohexylene-oxy-1,3-xylylene),
poly(oxy-1-oxa-3,5-cyclohexylene-oxy-1,4-xylylene),
poly(oxy-1-oxa-4,9-cyclodecylene-oxy-ethylene),
poly(oxy-1-oxa-4,9-cyclodecylene-oxy-butylene),
poly(oxy-1-oxa-4,9-cyclodecylene-oxy-hexylene),
poly(oxy-1-oxa-4,9-cyclodecylene-oxy-decylene),
poly(oxy-1-oxa-4,9-cyclodecylene-oxy-dodecylene),
poly(oxy-1-oxa-4,9-cyclodecylene-oxy-tetradecylene),
poly(oxy-1-oxa-4,9-cyclodecylene-oxy-hexadecylene),
poly(oxy-1-oxa-4,9-cyclodecylene-oxy-octadecylene),
poly(oxy-1-oxa-4,9-cyclodecylene-oxy-eicosylene),
poly(oxy-1-oxa-4,9-cyclodecylene-oxy-3,3-dimethylpentylene),
poly(oxy-1-oxa-4,9-cyclodecylene-oxy-3,3-dichlorohexylene),
poly(oxy-1-oxa-4,9-cyclodecylene-oxy-4-phenylheptylene), poly(oxy-1-oxa-4,9-cyclodecylene-oxy-4-ethoxycarbonyloctylene),
poly(oxy-1-oxa-4,9-cyclodecylene-oxy-5-nitrododecylene),
poly(oxy-1-oxa-4,9-cyclodecylene-oxy-7-cyanohexadecylene),
poly(oxy-1-oxa-4,9-cyclodecylene-oxy-1,2-cyclohexylene),
poly(oxy-1-oxa-4,9-cyclodecylene-oxy-1,2-phenylene),
poly(oxy-1-oxa-4,9-cyclodecylene-oxy-1,3-phenylene),
poly(oxy-1-oxa-4,9-cyclodecylene-oxy-1,4-phenylene),
poly(oxy-1-oxa-4,9-cyclodecylene-oxy-1,2-xylylene),
poly(oxy-1-oxa-4,9-cyclodecylene-oxy-1,3-xylylene),
poly(oxy-1-oxa-4,9-cyclodecylene-oxy-1,4-xylylene),
poly(oxy-1-oxa-6,13-cyclotetradecylene-oxy-ethylene),
poly(oxy-1-oxa-6,13-cyclotetradecylene-oxy-butylene),
poly(oxy-1-oxa-6,13-cyclotetradecylene-oxy-hexylene),
poly(oxy-1-oxa-6,13-cyclotetradecylene-oxy-decylene),
poly(oxy-1-oxa-6,13-cyclotetradecylene-oxy-dodecylene),
poly(oxy-1-oxa-6,13-cyclotetradecylene-oxy-tetradecylene),
poly(oxy-1-oxa-6,13-cyclotetradecylene-oxy-hexadecylene),
poly(oxy-1-oxa-6,13-cyclotetradecylene-oxy-octadecylene),
poly(oxy-1-oxa-6,13-cyclotetradecylene-oxy-eicosylene),
poly(oxy-1-oxa-6,13-cyclotetradecylene-oxy-3,3-dimethylpentylene),
poly(oxy-1-oxa-6,13-cyclotetradecylene-oxy-3,3-dichlorohexylene),
poly(oxy-1-oxa-6,13-cyclotetradecylene-oxy-4-phenylheptylene),
poly(oxy-1-oxa-6,13-cyclotetradecylene-oxy-4-ethoxycarbonyloctylene),
poly(oxy-1-oxa-6,13-cyclotetradecylene-oxy-5-nitrododecylene),
poly(oxy-1-oxa-6,13-cyclotetradecylene-oxy-7-cyanohexadecylene),
poly(oxy-1-oxa-6,13-cyclotetradecylene-oxy-1,2-cyclohexylene),
poly(oxy-1-oxa-6,13-cyclotetradecylene-oxy-1,2-phenylene),
poly(oxy-1-oxa-6,13-cyclotetradecylene-oxy-1,3-phenylene),
poly(oxy-1-oxa-6,13-cyclotetradecylene-oxy-1,4-phenylene),
poly(oxy-1-oxa-6,13-cyclotetradecylene-oxy-1,2-xylylene),
poly(oxy-1-oxa-6,13-cyclotetradecylene-oxy-1,3-xylylene),
poly(oxy-1-oxa-6,13-cyclotetradecylene-oxy-1,4-xylylene),
poly(oxy-1,6-dioxa-3,8-cyclodecylene-oxy-ethylene),
poly(oxy-1,6-dioxa-3,8-cyclodecylene-oxy-butylene),
poly(oxy-1,6-dioxa-3,8-cyclodecylene-oxy-hexylene),
poly(oxy-1,6-dioxa-3,8-cyclodecylene-oxy-decylene),
poly(oxy-1,6-dioxa-3,8-cyclodecylene-oxy-dodecylene),
poly(oxy-1,6-dioxa-3,8-cyclodecylene-oxy-tetradecylene),
poly(oxy-1,6-dioxa-3,8-cyclodecylene-oxy-hexadecylene),
poly(oxy-1,6-dioxa-3,8-cyclodecylene-oxy-octadecylene),
poly(oxy-1,6-dioxa-3,8-cyclodecylene-oxy-eicosylene),
poly(oxy-1,6-dioxa-3,8-cyclodecylene-oxy-3,3-dimethylpentylene),
poly(oxy-1,6-dioxa-3,8-cyclodecylene-oxy-3,3-dichlorohexylene),
poly(oxy-1,6-dioxa-3,8-cyclodecylene-oxy-4-phenylheptylene),
poly(oxy-1,6-dioxa-3,8-cyclodecylene-oxy-4-ethoxycarbonyloctylene),
poly(oxy-1,6-dioxa-3,8-cyclodecylene-oxy-5-nitrododecylene),
poly(oxy-1,6-dioxa-3,8-cyclodecylene-oxy-7-cyanohexadecylene),
poly(oxy-1,6-dioxa-3,8-cyclodecylene-oxy-1,2-cyclohexylene),
poly(oxy-1,6-dioxa-3,8-cyclodecylene-oxy-1,2-phenylene),
poly(oxy-1,6-dioxa-3,8-cyclodecylene-oxy-1,3-phenylene),
poly(oxy-1,6-dioxa-3,8-cyclodecylene-oxy-1,4-phenylene),
poly(oxy-1,6-dioxa-3,8-cyclodecylene-oxy-1,2-xylylene),
poly(oxy-1,6-dioxa-3,8-cyclodecylene-oxy-1,3-xylylene),
poly(oxy-1,6-dioxa-3,8-cyclodecylene-oxy-1,4-xylylene),
poly(oxy-1-thio-3,7-cyclooctylene-oxy-ethylene),
poly(oxy-1-thio-3,7-cyclooctylene-oxy-butylene),
poly(oxy-1-thio-3,7-cyclooctylene-oxy-hexylene),
poly(oxy-1-thio-3,7-cyclooctylene-oxy-decylene),
poly(oxy-1-thio-3,7-cyclooctylene-oxy-dodecylene),
poly(oxy-1-thio-3,7-cyclooctylene-oxy-tetradecylene),
poly(oxy-1-thio-3,7-cyclooctylene-oxy-hexadecylene),
poly(oxy-1-thio-3,7-cyclooctylene-oxy-octadecylene),
poly(oxy-1-thio-3,7-cyclooctylene-oxy-eicosylene),
poly(oxy-1-thio-3,7-cyclooctylene-oxy-3,3-dimethylpentylene),
poly(oxy-1-thio-3,7-cyclooctylene-oxy-3,3-dichlorohexylene),
poly(oxy-1-thio-3,7-cyclooctylene-oxy-4-phenylheptylene),
poly(oxy-1-thio-3,7-cyclooctylene-oxy-4-ethoxycarbonyloctylene),
poly(oxy-1-thio-3,7-cyclooctylene-oxy-5-nitrododecylene),
poly(oxy-1-thio-3,7-cyclooctylene-oxy-7-cyanohexadecylene),
poly(oxy-1-thio-3,7-cyclooctylene-oxy-1,2-cyclohexylene),
poly(oxy-1-thio-3,7-cyclooctylene-oxy-1,2-phenylene),
poly(oxy-1-thio-3,7-cyclooctylene-oxy-1,3-phenylene),
poly(oxy-1-thio-3,7-cyclooctylene-oxy-1,4-phenylene),
poly(oxy-1-thio-3,7-cyclooctylene-oxy-1,2-xylylene),
poly(oxy-1-thio-3,7-cyclooctylene-oxy-1,3-xylylene), and
poly(oxy-1-thio-3,7-cyclooctylene-oxy-1,4-xylylene).

The polyether polymer of the present invention is preferably a polyether polymer, wherein $R^1$ in the formula [1] is a group of a mono-cyclic structure of an alicyclic hydrocarbon having a $C_{6-20}$ cyclic skeleton, or a polyether polymer, wherein $R^1$ therein is a group of a structure formed by a mutual linking, directly or through a cross-linking group, of plurality of a mono-cyclic structure of an alicyclic hydrocarbon having a $C_{3-20}$ cyclic skeleton.

Preferable examples of the polyether polymer of the present invention are as follows:
poly(oxy-1,4-cyclohexylene-oxy-ethylene),
poly(oxy-1,4-cyclohexylene-oxy-butylene),
poly(oxy-1,4-cyclohexylene-oxy-hexylene),
poly(oxy-1,4-cyclohexylene-oxy-decylene),
poly(oxy-1,4-cyclohexylene-oxy-dodecylene),
poly(oxy-1,4-cyclohexylene-oxy-tetradecylene),
poly(oxy-1,4-cyclohexylene-oxy-hexadecylene),
poly(oxy-1,4-cyclohexylene-oxy-octadecylene),
poly(oxy-1,4-cyclohexylene-oxy-eicosylene),
poly(oxy-1,4-cyclohexylene-oxy-3,3-dimethylpentylene),
poly(oxy-1,4-cyclohexylene-oxy-3,3-dichlorohexylene),
poly(oxy-1,4-cyclohexylene-oxy-4-phenylheptylene),
poly(oxy-1,4-cyclohexylene-oxy-4-ethoxycarbonyloctylene),
poly(oxy-1,4-cyclohexylene-oxy-5-nitrododecylene),
poly(oxy-1,4-cyclohexylene-oxy-7-cyanohexadecylene),
poly(oxy-1,4-cyclohexylene-oxy-1,2-cyclohexylene),
poly(oxy-1,4-cyclohexylene-oxy-1,2-phenylene),
poly(oxy-1,4-cyclohexylene-oxy-1,3-phenylene),
poly(oxy-1,4-cyclohexylene-oxy-1,4-phenylene),
poly(oxy-1,4-cyclohexylene-oxy-1,2-xylylene), poly(oxy-1,4-cyclohexylene-oxy-1,3-xylylene),
poly(oxy-1,4-cyclohexylene-oxy-1,4-xylylene),
poly(oxy-1,5-cyclooctylene-oxy-ethylene),
poly(oxy-1,5-cyclohexylene-oxy-butylene),
poly(oxy-1,5-cyclohexylene-oxy-hexylene),
poly(oxy-1,5-cyclohexylene-oxy-decylene),
poly(oxy-1,5-cyclohexylene-oxy-dodecylene),
poly(oxy-1,5-cyclohexylene-oxy-tetradecylene),
poly(oxy-1,5-cyclohexylene-oxy-hexadecylene),
poly(oxy-1,5-cyclohexylene-oxy-octadecylene),
poly(oxy-1,5-cyclohexylene-oxy-eicosylene),
poly(oxy-1,5-cyclohexylene-oxy-3,3-dimethylpentylene),
poly(oxy-1,5-cyclohexylene-oxy-3,3-dichlorohexylene),
poly(oxy-1,5-cyclohexylene-oxy-4-phenylheptylene),
poly(oxy-1,5-cyclohexylene-oxy-4-ethoxycarbonyloctylene),
poly(oxy-1,5-cyclohexylene-oxy-5-nitrododecylene),
poly(oxy-1,5-cyclohexylene-oxy-7-cyanohexadecylene),
poly(oxy-1,5-cyclohexylene-oxy-1,2-cyclohexylene),
poly(oxy-1,5-cyclohexylene-oxy-1,2-phenylene),
poly(oxy-1,5-cyclohexylene-oxy-1,3-phenylene),
poly(oxy-1,5-cyclohexylene-oxy-1,4-phenylene),
poly(oxy-1,5-cyclohexylene-oxy-1,2-xylylene),
poly(oxy-1,5-cyclohexylene-oxy-1,3-xylylene),
poly(oxy-1,5-cyclohexylene-oxy-1,4-xylylene),
poly(oxy-1,10-cyclooctadecylene-oxy-ethylene),
poly(oxy-1,10-cyclooctadecylene-oxy-butylene),
poly(oxy-1,10-cyclooctadecylene-oxy-hexylene),
poly(oxy-1,10-cyclooctadecylene-oxy-decylene),
poly(oxy-1,10-cyclooctadecylene-oxy-dodecylene),
poly(oxy-1,10-cyclooctadecylene-oxy-tetradecylene),
poly(oxy-1,10-cyclooctadecylene-oxy-hexadecylene),
poly(oxy-1,10-cyclooctadecylene-oxy-octadecylene),
poly(oxy-1,10-cyclooctadecylene-oxy-eicosylene),
poly(oxy-1,10-cyclooctadecylene-oxy-3,3-dimethylpentylene),
poly(oxy-1,10-cyclooctadecylene-oxy-3,3-dichlorohexylene),
poly(oxy-1,10-cyclooctadecylene-oxy-4-phenylheptylene),
poly(oxy-1,10-cyclooctadecylene-oxy-4-ethoxycarbonyloctylene),
poly(oxy-1,10-cyclooctadecylene-oxy-5-nitrododecylene),
poly(oxy-1,10-cyclooctadecylene-oxy-7-cyanohexadecylene),
poly(oxy-1,10-cyclooctadecylene-oxy-1,2-cyclohexylene),
poly(oxy-1,10-cyclooctadecylene-oxy-1,2-phenylene),
poly(oxy-1,10-cyclooctadecylene-oxy-1,3-phenylene),
poly(oxy-1,10-cyclooctadecylene-oxy-1,4-phenylene),
poly(oxy-1,10-cyclooctadecylene-oxy-1,2-xylylene),
poly(oxy-1,10-cyclooctadecylene-oxy-1,3-xylylene),
poly(oxy-1,10-cyclooctadecylene-oxy-1,4-xylylene),
poly(oxy-2-ethyl-1,4-cyclohexylene-oxy-ethylene),
poly(oxy-2-ethyl-1,4-cyclohexylene-oxy-butylene),
poly(oxy-2-ethyl-1,4-cyclohexylene-oxy-hexylene),
poly(oxy-2-ethyl-1,4-cyclohexylene-oxy-decylene),
poly(oxy-2-ethyl-1,4-cyclohexylene-oxy-dodecylene),
poly(oxy-2-ethyl-1,4-cyclohexylene-oxy-tetradecylene),
poly(oxy-2-ethyl-1,4-cyclohexylene-oxy-hexadecylene),
poly(oxy-2-ethyl-1,4-cyclohexylene-oxy-octadecylene),
poly(oxy-2-ethyl-1,4-cyclohexylene-oxy-eicosylene),
poly(oxy-2-ethyl-1,4-cyclohexylene-oxy-3,3-dimethylpentylene),
poly(oxy-2-ethyl-1,4-cyclohexylene-oxy-3,3-dichlorohexylene),
poly(oxy-2-ethyl-1,4-cyclohexylene-oxy-4-phenylheptylene),
poly(oxy-2-ethyl-1,4-cyclohexylene-oxy-4-ethoxycarbonyloctylene),
poly(oxy-2-ethyl-1,4-cyclohexylene-oxy-5-nitrododecylene),
poly(oxy-2-ethyl-1,4-cyclohexylene-oxy-7-cyanohexadecylene),
poly(oxy-2-ethyl-1,4-cyclohexylene-oxy-1,2-cyclohexylene),
poly(oxy-2-ethyl-1,4-cyclohexylene-oxy-1,2-phenylene),
poly(oxy-2-ethyl-1,4-cyclohexylene-oxy-1,3-phenylene),
poly(oxy-2-ethyl-1,4-cyclohexylene-oxy-1,4-phenylene),
poly(oxy-2-ethyl-1,4-cyclohexylene-oxy-1,2-xylylene),
poly(oxy-2-ethyl-1,4-cyclohexylene-oxy-1,3-xylylene),
poly(oxy-2-ethyl-1,4-cyclohexylene-oxy-1,4-xylylene),
poly[oxy-2-(tert-butyl)-1,4-cyclohexylene-oxy-ethylene],
poly[oxy-2-(tert-butyl)-1,4-cyclohexylene-oxy-butylene],
poly[oxy-2-(tert-butyl)-1,4-cyclohexylene-oxy-hexylene],
poly[oxy-2-(tert-butyl)-1,4-cyclohexylene-oxy-decylene],
poly[oxy-2-(tert-butyl)-1,4-cyclohexylene-oxy-dodecylene],
poly[oxy-2-(tert-butyl)-1,4-cyclohexylene-oxy-tetradecylene],
poly[oxy-2-(tert-butyl)-1,4-cyclohexylene-oxy-hexadecylene],
poly[xy-2-(tert-butyl)-1,4-cyclohexylene-oxy-octadecylene],
poly[oxy-2-(tert-butyl)-1,4-cyclohexylene-oxy-eicosylene],
poly[oxy-2-(tert-butyl)-1,4-cyclohexylene-oxy-3,3-dimethylpentylene],
poly[oxy-2-(tert-butyl)-1,4-cyclohexylene-oxy-3,3-dichlorohexylene],
poly[oxy-2-(tert-butyl)-1,4-cyclohexylene-oxy-4-phenylheptylene],
poly[oxy-2-(tert-butyl)-1,4-cyclohexylene-oxy-4-ethoxycarbonyloctylene],
poly[oxy-2-(tert-butyl)-1,4-cyclohexylene-oxy-5-nitrododecylene],
poly[oxy-2-(tert-butyl)-1,4-cyclohexylene-oxy-7-cyanohexadecylene],
poly[oxy-2-(tert-butyl)-1,4-cyclohexylene-oxy-1,2-cyclohexylene],
poly[oxy-2-(tert-butyl)-1,4-cyclohexylene-oxy-1,2-phenylene],
poly[oxy-2-(tert-butyl)-1,4-cyclohexylene-oxy-1,3-phenylene],
poly[oxy-2-(tert-butyl)-1,4-cyclohexylene-oxy-1,4-phenylene],
poly[oxy-2-(tert-butyl)-1,4-cyclohexylene-oxy-1,2-xylylene],
poly[oxy-2-(tert-butyl)-1,4-cyclohexylene-oxy-1,3-xylylene],
poly[oxy-2-(tert-butyl)-1,4-cyclohexylene-oxy-1,4-xylylene],
poly(oxy-2,5-dihexyl-1,4-cyclohexylene-oxy-ethylene),
poly(oxy-2,5-dihexyl-1,4-cyclohexylene-oxy-butylene),
poly(oxy-2,5-dihexyl-1,4-cyclohexylene-oxy-hexylene),
poly(oxy-2,5-dihexyl-1,4-cyclohexylene-oxy-decylene),
poly(oxy-2,5-dihexyl-1,4-cyclohexylene-oxy-dodecylene),
poly(oxy-2,5-dihexyl-1,4-cyclohexylene-oxy-tetradecylene),
poly(oxy-2,5-dihexyl-1,4-cyclohexylene-oxy-hexadecylene),
poly(oxy-2,5-dihexyl-1,4-cyclohexylene-oxy-octadecylene),
poly(oxy-2,5-dihexyl-1,4-cyclohexylene-oxy-eicosylene),
poly(oxy-2,5-dihexyl-1,4-cyclohexylene-oxy-3,3-dimethylpentylene), poly(oxy-2,5-dihexyl-1,4-cyclohexylene-oxy-3,3-dichlorohexylene),
poly(oxy-2,5-dihexyl-1,4-cyclohexylene-oxy-4-phenylheptylene),
poly(oxy-2,5-dihexyl-1,4-cyclohexylene-oxy-4-ethoxycarbonyloctylene),
poly(oxy-2,5-dihexyl-1,4-cyclohexylene-oxy-5-nitrododecylene),
poly(oxy-2,5-dihexyl-1,4-cyclohexylene-oxy-7-cyanohexadecylene),
poly(oxy-2,5-dihexyl-1,4-cyclohexylene-oxy-1,2-cyclohexylene),
poly(oxy-2,5-dihexyl-1,4-cyclohexylene-oxy-1,2-phenylene),
poly(oxy-2,5-dihexyl-1,4-cyclohexylene-oxy-1,3-phenylene),
poly(oxy-2,5-dihexyl-1,4-cyclohexylene-oxy-1,4-phenylene),
poly(oxy-2,5-dihexyl-1,4-cyclohexylene-oxy-1,2-xylylene),
poly(oxy-2,5-dihexyl-1,4-cyclohexylene-oxy-1,3-xylylene),
poly(oxy-2,5-dihexyl-1,4-cyclohexylene-oxy-1,4-xylylene),
poly(oxy-2-fluoromethyl-1,4-cyclohexylene-oxy-ethylene),
poly(oxy-2-fluoromethyl-1,4-cyclohexylene-oxy-butylene),
poly(oxy-2-fluoromethyl-1,4-cyclohexylene-oxy-hexylene),
poly(oxy-2-fluoromethyl-1,4-cyclohexylene-oxy-decylene),
poly(oxy-2-fluoromethyl-1,4-cyclohexylene-oxy-dodecylene),
poly(oxy-2-fluoromethyl-1,4-cyclohexylene-oxy-tetradecylene),
poly(oxy-2-fluoromethyl-1,4-cyclohexylene-oxy-hexadecylene),
poly(oxy-2-fluoromethyl-1,4-cyclohexylene-oxy-octadecylene),
poly(oxy-2-fluoromethyl-1,4-cyclohexylene-oxy-eicosylene),
poly(oxy-2-fluoromethyl-1,4-cyclohexylene-oxy-3,3-dimethylpentylene),
poly(oxy-2-fluoromethyl-1,4-cyclohexylene-oxy-3,3-dichlorohexylene),
poly(oxy-2-fluoromethyl-1,4-cyclohexylene-oxy-4-phenylheptylene),
poly(oxy-2-fluoromethyl-1,4-cyclohexylene-oxy-4-ethoxycarbonyloctylene),
poly(oxy-2-fluoromethyl-1,4-cyclohexylene-oxy-5-nitrododecylene),
poly(oxy-2-fluoromethyl-1,4-cyclohexylene-oxy-7-cyanohexadecylene),
poly(oxy-2-fluoromethyl-1,4-cyclohexylene-oxy-1,2-cyclohexylene),
poly(oxy-2-fluoromethyl-1,4-cyclohexylene-oxy-1,2-phenylene),
poly(oxy-2-fluoromethyl-1,4-cyclohexylene-oxy-1,3-phenylene),
poly(oxy-2-fluoromethyl-1,4-cyclohexylene-oxy-1,4-phenylene),
poly(oxy-2-fluoromethyl-1,4-cyclohexylene-oxy-1,2-xylylene),
poly(oxy-2-fluoromethyl-1,4-cyclohexylene-oxy-1,3-xylylene),
poly(oxy-2-fluoromethyl-1,4-cyclohexylene-oxy-1,4-xylylene),
poly(oxy-2-dichloromethyl-1,4-cyclohexylene-oxy-ethylene),
poly(oxy-2-dichloromethyl-1,4-cyclohexylene-oxy-butylene),
poly(oxy-2-dichloromethyl-1,4-cyclohexylene-oxy-hexylene),
poly(oxy-2-dichloromethyl-1,4-cyclohexylene-oxy-decylene),
poly(oxy-2-dichloromethyl-1,4-cyclohexylene-oxy-dodecylene),
poly(oxy-2-dichloromethyl-1,4-cyclohexylene-oxy-tetradecylene),
poly(oxy-2-dichloromethyl-1,4-cyclohexylene-oxy-hexadecylene),
poly(oxy-2-dichloromethyl-1,4-cyclohexylene-oxy-octadecylene),
poly(oxy-2-dichloromethyl-1,4-cyclohexylene-oxy-eicosylene),
poly(oxy-2-dichloromethyl-1,4-cyclohexylene-oxy-3,3-dimethylpentylene),
poly(oxy-2-dichloromethyl-1,4-cyclohexylene-oxy-3,3-dichlorohexylene),
poly(oxy-2-dichloromethyl-1,4-cyclohexylene-oxy-4-phenylheptylene),
poly(oxy-2-dichloromethyl-1,4-cyclohexylene-oxy-4-ethoxycarbonyloctylene),
poly(oxy-2-dichloromethyl-1,4-cyclohexylene-oxy-5-nitrododecylene),
poly(oxy-2-dichloromethyl-1,4-cyclohexylene-oxy-7-cyanohexadecylene),
poly(oxy-2-dichloromethyl-1,4-cyclohexylene-oxy-1,2-cyclohexylene),
poly(oxy-2-dichloromethyl-1,4-cyclohexylene-oxy-1,2-phenylene),
poly(oxy-2-dichloromethyl-1,4-cyclohexylene-oxy-1,3-phenylene),
poly(oxy-2-dichloromethyl-1,4-cyclohexylene-oxy-1,4-phenylene),
poly(oxy-2-dichloromethyl-1,4-cyclohexylene-oxy-1,2-xylylene),
poly(oxy-2-dichloromethyl-1,4-cyclohexylene-oxy-1,3-xylylene),
poly(oxy-2-dichloromethyl-1,4-cyclohexylene-oxy-1,4-xylylene),
poly(oxy-2-tribromomethyl-1,4-cyclohexylene-oxy-ethylene),
poly(oxy-2-tribromomethyl-1,4-cyclohexylene-oxy-butylene),
poly(oxy-2-tribromomethyl-1,4-cyclohexylene-oxy-hexylene),
poly(oxy-2-tribromomethyl-1,4-cyclohexylene-oxy-decylene),
poly(oxy-2-tribromomethyl-1,4-cyclohexylene-oxy-dodecylene),
poly(oxy-2-tribromomethyl-1,4-cyclohexylene-oxy-tetradecylene),
poly(oxy-2-tribromomethyl-1,4-cyclohexylene-oxy-hexadecylene),
poly(oxy-2-tribromomethyl-1,4-cyclohexylene-oxy-octadecylene),
poly(oxy-2-tribromomethyl-1,4-cyclohexylene-oxy-eicosylene),
poly(oxy-2-tribromomethyl-1,4-cyclohexylene-oxy-3,3-dimethylpentylene),
poly(oxy-2-tribromomethyl-1,4-cyclohexylene-oxy-3,3-dichlorohexylene),
poly(oxy-2-tribromomethyl-1,4-cyclohexylene-oxy-4-phenylheptylene),
poly(oxy-2-tribromomethyl-1,4-cyclohexylene-oxy-4-ethoxycarbonyloctylene),
poly(oxy-2-tribromomethyl-1,4-cyclohexylene-oxy-5-nitrododecylene), poly(oxy-2-tribromomethyl-1,4-cyclohexylene-oxy-7-cyanohexadecylene),
poly(oxy-2-tribromomethyl-1,4-cyclohexylene-oxy-1,2-cyclohexylene),
poly(oxy-2-tribromomethyl-1,4-cyclohexylene-oxy-1,2-phenylene),
poly(oxy-2-tribromomethyl-1,4-cyclohexylene-oxy-1,3-phenylene),
poly(oxy-2-tribromomethyl-1,4-cyclohexylene-oxy-1,4-phenylene),
poly(oxy-2-tribromomethyl-1,4-cyclohexylene-oxy-1,2-xylylene),
poly(oxy-2-tribromomethyl-1,4-cyclohexylene-oxy-1,3-xylylene),
poly(oxy-2-tribromomethyl-1,4-cyclohexylene-oxy-1,4-xylylene),
poly[oxy-2,5-bis(bromomethyl)-1,4-cyclohexylene-oxy-ethylene],
poly[oxy-2,5-bis(bromomethyl)-1,4-cyclohexylene-oxy-butylene],
poly[oxy-2,5-bis(bromomethyl)-1,4-cyclohexylene-oxy-hexylene],
poly[oxy-2,5-bis(bromomethyl)-1,4-cyclohexylene-oxy-decylene],
poly[oxy-2,5-bis(bromomethyl)-1,4-cyclohexylene-oxy-dodecyl ene],
poly[oxy-2,5-bis(bromomethyl)-1,4-cyclohexylene-oxy-tetradecylene],
poly[oxy-2,5-bis(bromomethyl)-1,4-cyclohexylene-oxy-hexadecylene],
poly[oxy-2,5-bis(bromomethyl)-1,4-cyclohexylene-oxy-octadecylene],
poly[oxy-2,5-bis(bromomethyl)-1,4-cyclohexylene-oxy-eicosylene],
poly[oxy-2,5-bis(bromomethyl)-1,4-cyclohexylene-oxy-3,3-dimethylpentylene],
poly[oxy-2,5-bis(bromomethyl)-1,4-cyclohexylene-oxy-3,3-dichlorohexylene],
poly[oxy-2,5-bis(bromomethyl)-1,4-cyclohexylene-oxy-4-phenylheptylene],
poly[oxy-2,5-bis(bromomethyl)-1,4-cyclohexylene-oxy-4-ethoxycarbonyloctylene],
poly[oxy-2,5-bis(bromomethyl)-1,4-cyclohexylene-oxy-5-nitrododecylene],
poly[oxy-2,5-bis(bromomethyl)-1,4-cyclohexylene-oxy-7-cyanohexadecylene],
poly[oxy-2,5-bis(bromomethyl)-1,4-cyclohexylene-oxy-1,2-cyclohexylene],
poly[oxy-2,5-bis(bromomethyl)-1,4-cyclohexylene-oxy-1,2-phenylene],
poly[oxy-2,5-bis(bromomethyl)-1,4-cyclohexylene-oxy-1,3-phenylene],
poly[oxy-2,5-bis(bromomethyl)-1,4-cyclohexylene-oxy-1,4-phenylene],
poly[oxy-2,5-bis(bromomethyl)-1,4-cyclohexylene-oxy-1,2-xylylene],
poly[oxy-2,5-bis(bromomethyl)-1,4-cyclohexylene-oxy-1,3-xylylene],
poly[oxy-2,5-bis(bromomethyl)-1,4-cyclohexylene-oxy-1,4-xylylene],
poly[oxy-2-(1,1,2,2,2-pentafluoroethyl)-1,4-cyclohexylene-oxy-ethylene],
poly[oxy-2-(1,1,2,2,2-pentafluoroethyl)-1,4-cyclohexylene-oxy-butylene],
poly[oxy-2-(1,1,2,2,2-pentafluoroethyl)-1,4-cyclohexylene-oxy-hexylene],
poly[oxy-2-(1,1,2,2,2-pentafluoroethyl)-1,4-cyclohexylene-oxy-decylene],
poly[oxy-2-(1,1,2,2,2-pentafluoroethyl)-1,4-cyclohexylene-oxy-dodecylene],
poly[oxy-2-(1,1,2,2,2-pentafluoroethyl)-1,4-cyclohexylene-oxy-tetradecylene],
poly[oxy-2-(1,1,2,2,2-pentafluoroethyl)-1,4-cyclohexylene-oxy-hexadecylene],
poly[oxy-2-(1,1,2,2,2-pentafluoroethyl)-1,4-cyclohexylene-o xy-octadecylene],
poly[oxy-2-(1,1,2,2,2-pentafluoroethyl)-1,4-cyclohexylene-oxy-eicosylene],
poly[oxy-2-(1,1,2,2,2-pentafluoroethyl)-1,4-cyclohexylene-oxy-3,3-dimethylpentylene],
poly[oxy-2-(1,1,2,2,2-pentafluoroethyl)-1,4-cyclohexylene-oxy-3,3-dichlorohexylene],
poly[oxy-2-(1,1,2,2,2-pentafluoroethyl)-1,4-cyclohexylene-oxy-4-phenylheptylene],
poly[oxy-2-(1,1,2,2,2-pentafluoroethyl)-1,4-cyclohexylene-oxy-4-ethoxycarbonyloctylene],
poly[oxy-2-(1,1,2,2,2-pentafluoroethyl)-1,4-cyclohexylene-oxy-5-nitrododecylene],
poly[oxy-2-(1,1,2,2,2-pentafluoroethyl)-1,4-cyclohexylene-oxy-7-cyanohexadecylene],
poly[oxy-2-(1,1,2,2,2-pentafluoroethyl)-1,4-cyclohexylene-oxy-1,2-cyclohexylene],
poly[oxy-2-(1,1,2,2,2-pentafluoroethyl)-1,4-cyclohexylene-oxy-1,2-phenylene],
poly[oxy-2-(1,1,2,2,2-pentafluoroethyl)-1,4-cyclohexylene-oxy-1,3-phenylene],
poly[oxy-2-(1,1,2,2,2-pentafluoroethyl)-1,4-cyclohexylene-oxy-1,4-phenylene],
poly[oxy-2-(1,1,2,2,2-pentafluoroethyl)-1,4-cyclohexylene-oxy-1,2-xylylene],
poly[oxy-2-(1,1,2,2,2-pentafluoroethyl)-1,4-cyclohexylene-oxy-1,3-xylylene],
poly[oxy-2-(1,1,2,2,2-pentafluoroethyl)-1,4-cyclohexylene-oxy-1,4-xylylene],
poly[oxy-2-(1,2-dichloroethyl)-1,4-cyclohexylene-oxy-ethylene],
poly[oxy-2-(1,2-dichloroethyl)-1,4-cyclohexylene-oxy-butylene],
poly[oxy-2-(1,2-dichloroethyl)-1,4-cyclohexylene-oxy-hexylene],
poly[oxy-2-(1,2-dichloroethyl)-1,4-cyclohexylene-oxy-decylene],
poly[oxy-2-(1,2-dichloroethyl)-1,4-cyclohexylene-oxy-dodecylene],
poly[oxy-2-(1,2-dichloroethyl)-1,4-cyclohexylene-oxy-tetradecylene],
poly[oxy-2-(1,2-dichloroethyl)-1,4-cyclohexylene-oxy-hexadecylene],
poly[oxy-2-(1,2-dichloroethyl)-1,4-cyclohexylene-oxy-octadecylene],
poly[oxy-2-(1,2-dichloroethyl)-1,4-cyclohexylene-oxy-eicosylene],
poly[oxy-2-(1,2-dichloroethyl)-1,4-cyclohexylene-oxy-3,3-dimethylpentylene],
poly[oxy-2-(1,2-dichloroethyl)-1,4-cyclohexylene-oxy-3,3-dichlorohexylene],
poly[oxy-2-(1,2-dichloroethyl)-1,4-cyclohexylene-oxy-4-phenylheptylene],
poly[oxy-2-(1,2-dichloroethyl)-1,4-cyclohexylene-oxy-4-ethoxycarbonyloctylene],
poly[oxy-2-(1,2-dichloroethyl)-1,4-cyclohexylene-oxy-5-nitrododecylene], poly[oxy-2-(1,2-dichloroethyl)-1,4-cyclohexylene-oxy-7-cyanohexadecylene],
poly[oxy-2-(1,2-dichloroethyl)-1,4-cyclohexylene-oxy-1,2-cyclohexylene],
poly[oxy-2-(1,2-dichloroethyl)-1,4-cyclohexylene-oxy-1,2-phenylene],
poly[oxy-2-(1,2-dichloroethyl)-1,4-cyclohexylene-oxy-1,3-phenylene],
poly[oxy-2-(1,2-dichloroethyl)-1,4-cyclohexylene-oxy-1,4-phenylene],
poly[oxy-2-(1,2-dichloroethyl)-1,4-cyclohexylene-oxy-1,2-xylylene],
poly[oxy-2-(1,2-dichloroethyl)-1,4-cyclohexylene-oxy-1,3-xylylene],
poly[oxy-2-(1,2-dichloroethyl)-1,4-cyclohexylene-oxy-1,4-xylylene],
poly[oxy-2-(1-bromobutyl)-1,4-cyclohexylene-oxy-ethylene],
poly[oxy-2-(1-bromobutyl)-1,4-cyclohexylene-oxy-butylene],
poly[oxy-2-(1-bromobutyl)-1,4-cyclohexylene-oxy-hexylene],
poly[oxy-2-(1-bromobutyl)-1,4-cyclohexylene-oxy-decylene],
poly[oxy-2-(1-bromobutyl)-1,4-cyclohexylene-oxy-dodecylene],
poly[oxy-2-(1-bromobutyl)-1,4-cyclohexylene-oxy-tetradecylene],
poly[oxy-2-(1-bromobutyl)-1,4-cyclohexylene-oxy-hexadecylene],
poly[oxy-2-(1-bromobutyl)-1,4-cyclohexylene-oxy-octadecylene],
poly[oxy-2-(1-bromobutyl)-1,4-cyclohexylene-oxy-eicosylene],
poly[oxy-2-(1-bromobutyl)-1,4-cyclohexylene-oxy-3,3-dimethylpentylene],
poly[oxy-2-(1-bromobutyl)-1,4-cyclohexylene-oxy-3,3-dichlorohexylene],
poly[oxy-2-(1-bromobutyl)-1,4-cyclohexylene-oxy-4-phenylheptylene],
poly[oxy-2-(1-bromobutyl)-1,4-cyclohexylene-oxy-4-ethoxycarbonyloctylene],
poly[oxy-2-(1-bromobutyl)-1,4-cyclohexylene-oxy-5-nitrododecylene],
poly[oxy-2-(1-bromobutyl)-1,4-cyclohexylene-oxy-7-cyanohexadecylene],
poly[oxy-2-(1-bromobutyl)-1,4-cyclohexylene-oxy-1,2-cyclohexylene],
poly[oxy-2-(1-bromobutyl)-1,4-cyclohexylene-oxy-1,2-phenylene],
poly[oxy-2-(1-bromobutyl)-1,4-cyclohexylene-oxy-1,3-phenylene],
poly[oxy-2-(1-bromobutyl)-1,4-cyclohexylene-oxy-1,4-phenylene],
poly[oxy-2-(1-bromobutyl)-1,4-cyclohexylene-oxy-1,2-xylylene],
poly[oxy-2-(1-bromobutyl)-1,4-cyclohexylene-oxy-1,3-xylylene],
poly[oxy-2-(1-bromobutyl)-1,4-cyclohexylene-oxy-1,4-xylylene],
poly(oxy-2-phenyl-1,4-cyclohexylene-oxy-ethylene),
poly(oxy-2-phenyl-1,4-cyclohexylene-oxy-butylene),
poly(oxy-2-phenyl-1,4-cyclohexylene-oxy-hexylene),
poly(oxy-2-phenyl-1,4-cyclohexylene-oxy-decylene),
poly(oxy-2-phenyl-1,4-cyclohexylene-oxy-dodecylene),
poly(oxy-2-phenyl-1,4-cyclohexylene-oxy-tetradecylene),
poly(oxy-2-phenyl-1,4-cyclohexylene-oxy-hexadecylene),
poly(oxy-2-phenyl-1,4-cyclohexylene-oxy-octadecylene),
poly(oxy-2-phenyl-1,4-cyclohexylene-oxy-eicosylene),
poly(oxy-2-phenyl-1,4-cyclohexylene-oxy-3,3-dimethylpentylene),
poly(oxy-2-phenyl-1,4-cyclohexylene-oxy-3,3-dichlorohexylene),
poly(oxy-2-phenyl-1,4-cyclohexylene-oxy-4-phenylheptylene),
poly(oxy-2-phenyl-1,4-cyclohexylene-oxy-4-ethoxycarbonyloctylene),
poly(oxy-2-phenyl-1,4-cyclohexylene-oxy-5-nitrododecylene),
poly(oxy-2-phenyl-1,4-cyclohexylene-oxy-7-cyanohexadecylene),
poly(oxy-2-phenyl-1,4-cyclohexylene-oxy-1,2-cyclohexylene),
poly(oxy-2-phenyl-1,4-cyclohexylene-oxy-1,2-phenylene),
poly(oxy-2-tribromomethyl-1,4-cyclohexylene-oxy-1,3-phenylene),
poly(oxy-2-tribromomethyl-1,4-cyclohexylene-oxy-1,4-phenylene),
poly(oxy-2-tribromomethyl-1,4-cyclohexylene-oxy-1,2-xylylene),
poly(oxy-2-tribromomethyl-1,4-cyclohexylene-oxy-1,3-xylylene),
poly(oxy-2-tribromomethyl-1,4-cyclohexylene-oxy-1,4-xylylene),
poly(oxy-2-ethyloxy-1,4-cyclohexylene-oxy-ethylene),
poly(oxy-2-ethyloxy-1,4-cyclohexylene-oxy-butylene),
poly(oxy-2-ethyloxy-1,4-cyclohexylene-oxy-hexylene),
poly(oxy-2-ethyloxy-1,4-cyclohexylene-oxy-decylene),
poly(oxy-2-ethyloxy-1,4-cyclohexylene-oxy-dodecylene),
poly(oxy-2-ethyloxy-1,4-cyclohexylene-oxy-tetradecylene),
poly(oxy-2-ethyloxy-1,4-cyclohexylene-oxy-hexadecylene),
poly(oxy-2-ethyloxy-1,4-cyclohexylene-oxy-octadecylene),
poly(oxy-2-ethyloxy-1,4-cyclohexylene-oxy-eicosylene),
poly(oxy-2-ethyloxy-1,4-cyclohexylene-oxy-3,3-dimethylpentylene),
poly(oxy-2-ethyloxy-1,4-cyclohexylene-oxy-3,3-dichlorohexylene),
poly(oxy-2-ethyloxy-1,4-cyclohexylene-oxy-4-phenylheptylene),
poly(oxy-2-ethyloxy-1,4-cyclohexylene-oxy-4-ethoxycarbonyloctylene),
poly(oxy-2-ethyloxy-1,4-cyclohexylene-oxy-5-nitrododecylene),
poly(oxy-2-ethyloxy-1,4-cyclohexylene-oxy-7-cyanohexadecylene),
poly(oxy-2-ethyloxy-1,4-cyclohexylene-oxy-1,2-cyclohexylene),
poly(oxy-2-ethyloxy-1,4-cyclohexylene-oxy-1,2-phenylene),
poly(oxy-2-ethyloxy-1,4-cyclohexylene-oxy-1,3-phenylene),
poly(oxy-2-ethyloxy-1,4-cyclohexylene-oxy-1,4-phenylene),
poly(oxy-2-ethyloxy-1,4-cyclohexylene-oxy-1,2-xylylene),
poly(oxy-2-ethyloxy-1,4-cyclohexylene-oxy-1,3-xylylene),
poly(oxy-2-ethyloxy-1,4-cyclohexylene-oxy-1,4-xylylene),
poly(oxy-2-propylthio-1,4-cyclohexylene-oxy-ethylene),
poly(oxy-2-propylthio-1,4-cyclohexylene-oxy-butylene),
poly(oxy-2-propylthio-1,4-cyclohexylene-oxy-hexylene),
poly(oxy-2-propylthio-1,4-cyclohexylene-oxy-decylene),
poly(oxy-2-propylthio-1,4-cyclohexylene-oxy-dodecylene),
poly(oxy-2-propylthio-1,4-cyclohexylene-oxy-tetradecylene), poly(oxy-2-propylthio-1,4-cyclohexylene-oxy-hexadecylene),
poly(oxy-2-propylthio-1,4-cyclohexylene-oxy-octadecylene),
poly(oxy-2-propylthio-1,4-cyclohexylene-oxy-eicosylene),
poly(oxy-2-propylthio-1,4-cyclohexylene-oxy-3,3-dimethylpentylene),
poly(oxy-2-propylthio-1,4-cyclohexylene-oxy-3,3-dichlorohexylene),
poly(oxy-2-propylthio-1,4-cyclohexylene-oxy-4-phenylheptylene),
poly(oxy-2-propylthio-1,4-cyclohexylene-oxy-4-ethoxycarbonyloctylene),
poly(oxy-2-propylthio-1,4-cyclohexylene-oxy-5-nitrododecylene),
poly(oxy-2-propylthio-1,4-cyclohexylene-oxy-7-cyanohexadecylene),
poly(oxy-2-propylthio-1,4-cyclohexylene-oxy-1,2-cyclohexylene),
poly(oxy-2-propylthio-1,4-cyclohexylene-oxy-1,2-phenylene),
poly(oxy-2-propylthio-1,4-cyclohexylene-oxy-1,3-phenylene),
poly(oxy-2-propylthio-1,4-cyclohexylene-oxy-1,4-phenylene),
poly(oxy-2-propylthio-1,4-cyclohexylene-oxy-1,2-xylylene),
poly(oxy-2-propylthio-1,4-cyclohexylene-oxy-1,3-xylylene),
poly(oxy-2-propylthio-1,4-cyclohexylene-oxy-1,4-xylylene),
poly(oxy-2-nitro-1,4-cyclohexylene-oxy-ethylene),
poly(oxy-2-nitro-1,4-cyclohexylene-oxy-butylene),
poly(oxy-2-nitro-1,4-cyclohexylene-oxy-hexylene),
poly(oxy-2-nitro-1,4-cyclohexylene-oxy-decylene),
poly(oxy-2-nitro-1,4-cyclohexylene-oxy-dodecylene),
poly(oxy-2-nitro-1,4-cyclohexylene-oxy-tetradecylene),
poly(oxy-2-nitro-1,4-cyclohexylene-oxy-hexadecylene),
poly(oxy-2-nitro-1,4-cyclohexylene-oxy-octadecylene),
poly(oxy-2-nitro-1,4-cyclohexylene-oxy-eicosylene),
poly(oxy-2-nitro-1,4-cyclohexylene-oxy-3,3-dimethylpentylene),
poly(oxy-2-nitro-1,4-cyclohexylene-oxy-3,3-dichlorohexylene),
poly(oxy-2-nitro-1,4-cyclohexylene-oxy-4-phenylheptylene),
poly(oxy-2-nitro-1,4-cyclohexylene-oxy-4-ethoxycarbonyloctylene),
poly(oxy-2-nitro-1,4-cyclohexylene-oxy-5-nitrododecylene),
poly(oxy-2-nitro-1,4-cyclohexylene-oxy-7-cyanohexadecylene),
poly(oxy-2-nitro-1,4-cyclohexylene-oxy-1,2-cyclohexylene),
poly(oxy-2-nitro-1,4-cyclohexylene-oxy-1,2-phenylene),
poly(oxy-2-nitro-1,4-cyclohexylene-oxy-1,3-phenylene),
poly(oxy-2-nitro-1,4-cyclohexylene-oxy-1,4-phenylene),
poly(oxy-2-nitro-1,4-cyclohexylene-oxy-1,2-xylylene),
poly(oxy-2-nitro-1,4-cyclohexylene-oxy-1,3-xylylene),
poly(oxy-2-nitro-1,4-cyclohexylene-oxy-1,4-xylylene),
poly(oxy-2-cyano-1,4-cyclohexylene-oxy-ethylene),
poly(oxy-2-cyano-1,4-cyclohexylene-oxy-butylene),
poly(oxy-2-cyano-1,4-cyclohexylene-oxy-hexylene),
poly(oxy-2-cyano-1,4-cyclohexylene-oxy-decylene),
poly(oxy-2-cyano-1,4-cyclohexylene-oxy-dodecylene),
poly(oxy-2-cyano-1,4-cyclohexylene-oxy-tetradecylene),
poly(oxy-2-cyano-1,4-cyclohexylene-oxy-hexadecylene),
poly(oxy-2-cyano-1,4-cyclohexylene-oxy-octadecylene),
poly(oxy-2-cyano-1,4-cyclohexylene-oxy-eicosylene),
poly(oxy-2-cyano-1,4-cyclohexylene-oxy-3,3-dimethylpentylene),
poly(oxy-2-cyano-1,4-cyclohexylene-oxy-3,3-dichlorohexylene),
poly(oxy-2-cyano-1,4-cyclohexylene-oxy-4-phenylheptylene),
poly(oxy-2-cyano-1,4-cyclohexylene-oxy-4-ethoxycarbonyloctylene),
poly(oxy-2-cyano-1,4-cyclohexylene-oxy-5-nitrododecylene),
poly(oxy-2-cyano-1,4-cyclohexylene-oxy-7-cyanohexadecylene),
poly(oxy-2-cyano-1,4-cyclohexylene-oxy-1,2-cyclohexylene),
poly(oxy-2-cyano-1,4-cyclohexylene-oxy-1,2-phenylene),
poly(oxy-2-cyano-1,4-cyclohexylene-oxy-1,3-phenylene),
poly(oxy-2-cyano-1,4-cyclohexylene-oxy-1,4-phenylene),
poly(oxy-2-cyano-1,4-cyclohexylene-oxy-1,2-xylylene),
poly(oxy-2-cyano-1,4-cyclohexylene-oxy-1,3-xylylene),
poly(oxy-2-cyano-1,4-cyclohexylene-oxy-1,4-xylylene),
poly(oxy-2-chloro-1,4-cyclohexylene-oxy-ethylene),
poly(oxy-2-chloro-1,4-cyclohexylene-oxy-butylene),
poly(oxy-2-chloro-1,4-cyclohexylene-oxy-hexylene),
poly(oxy-2-chloro-1,4-cyclohexylene-oxy-decylene),
poly(oxy-2-chloro-1,4-cyclohexylene-oxy-dodecylene),
poly(oxy-2-chloro-1,4-cyclohexylene-oxy-tetradecylene),
poly(oxy-2-chloro-1,4-cyclohexylene-oxy-hexadecylene),
poly(oxy-2-chloro-1,4-cyclohexylene-oxy-octadecylene),
poly(oxy-2-chloro-1,4-cyclohexylene-oxy-eicosylene),
poly(oxy-2-chloro-1,4-cyclohexylene-oxy-3,3-dimethylpentylene),
poly(oxy-2-chloro-1,4-cyclohexylene-oxy-3,3-dichlorohexylene),
poly(oxy-2-chloro-1,4-cyclohexylene-oxy-4-phenylheptylene),
poly(oxy-2-chloro-1,4-cyclohexylene-oxy-4-ethoxycarbonyloctylene),
poly(oxy-2-chloro-1,4-cyclohexylene-oxy-5-nitrododecylene),
poly(oxy-2-chloro-1,4-cyclohexylene-oxy-7-cyanohexadecylene),
poly(oxy-2-chloro-1,4-cyclohexylene-oxy-1,2-cyclohexylene),
poly(oxy-2-chloro-1,4-cyclohexylene-oxy-1,2-phenylene),
poly(oxy-2-chloro-1,4-cyclohexylene-oxy-1,3-phenylene),
poly(oxy-2-chloro-1,4-cyclohexylene-oxy-1,4-phenylene),
poly(oxy-2-chloro-1,4-cyclohexylene-oxy-1,2-xylylene),
poly(oxy-2-chloro-1,4-cyclohexylene-oxy-1,3-xylylene),
poly(oxy-2-chloro-1,4-cyclohexylene-oxy-1,4-xylylene),
poly(oxy-2-butylsilyl-1,4-cyclohexylene-oxy-ethylene),
poly(oxy-2-butylsilyl-1,4-cyclohexylene-oxy-butylene),
poly(oxy-2-butylsilyl-1,4-cyclohexylene-oxy-hexylene),
poly(oxy-2-butylsilyl-1,4-cyclohexylene-oxy-decylene),
poly(oxy-2-butylsilyl-1,4-cyclohexylene-oxy-dodecylene),
poly(oxy-2-butylsilyl-1,4-cyclohexylene-oxy-tetradecylene),
poly(oxy-2-butylsilyl-1,4-cyclohexylene-oxy-hexadecylene),
poly(oxy-2-butylsilyl-1,4-cyclohexylene-oxy-octadecylene),
poly(oxy-2-butylsilyl-1,4-cyclohexylene-oxy-eicosylene),
poly(oxy-2-butylsilyl-1,4-cyclohexylene-oxy-3,3-dimethylpentylene),
poly(oxy-2-butylsilyl-1,4-cyclohexylene-oxy-3,3-dichlorohexylene), poly(oxy-2-butylsilyl-1,4-cyclohexylene-oxy-4-phenylheptylene),
poly(oxy-2-butylsilyl-1,4-cyclohexylene-oxy-4-ethoxycarbonyloctylene),
poly(oxy-2-butylsilyl-1,4-cyclohexylene-oxy-5-nitrododecylene),
poly(oxy-2-butylsilyl-1,4-cyclohexylene-oxy-7-cyanohexadecylene),
poly(oxy-2-butylsilyl-1,4-cyclohexylene-oxy-1,2-cyclohexylene),
poly(oxy-2-butylsilyl-1,4-cyclohexylene-oxy-1,2-phenylene),
poly(oxy-2-butylsilyl-1,4-cyclohexylene-oxy-1,3-phenylene),
poly(oxy-2-butylsilyl-1,4-cyclohexylene-oxy-1,4-phenylene),
poly(oxy-2-butylsilyl-1,4-cyclohexylene-oxy-1,2-xylylene),
poly(oxy-2-butylsilyl-1,4-cyclohexylene-oxy-1,3-xylylene),
poly(oxy-2-butylsilyl-1,4-cyclohexylene-oxy-1,4-xylylene),
poly[oxy-methylenebis(1,2-cyclopropylene)-oxy-ethylene],
poly[oxy-methylenebis(1,2cyclopropylene)-oxy-butylene],
poly[oxy-methylenebis(1,2-cyclopropylene)-oxy-hexylene],
poly[oxy-methylenebis(1,2-cyclopropylene)-oxy-decylene],
poly[oxy-methylenebis(1,2-cyclopropylene)-oxy-dodecylene],
poly[oxy-methylenebis(1,2-cyclopropylene)-oxy-tetradecylene],
poly[oxy-methylenebis(1,2-cyclopropylene)-oxy-hexadecylene],
poly[oxy-methylenebis(1,2-cyclopropylene)-oxy-octadecylene],
poly[oxy-methylenebis(1,2-cyclopropylene)-oxy-eicosylene],
poly[oxy-methylenebis(1,2-cyclopropylene)-oxy-3,3-dimethylpentylene],
poly[oxy-methylenebis(1,2-cyclopropylene)-oxy-3,3-dichlorohexylene],
poly[oxy-methylenebis(1,2-cyclopropylene)-oxy-4-phenylheptylene],
poly[oxy-methylenebis(1,2-cyclopropylene)-oxy-4-ethoxycarbonyloctylene],
poly[oxy-methylenebis(1,2-cyclopropylene)-oxy-5-nitrododecylene],
poly[oxy-methylenebis(1,2-cyclopropylene)-oxy-7-cyanohexadecylene],
poly[oxy-methylenebis(1,2-cyclopropylene)-oxy-1,2-cyclohexylene],
poly[oxy-methylenebis(1,2-cyclopropylene)-oxy-1,2-phenylene],
poly[oxy-methylenebis(1,2-cyclopropylene)-oxy-1,3-phenylene],
poly[oxy-methylenebis(1,2-cyclopropylene)-oxy-1,4-phenylene],
poly[oxy-methylenebis(1,2-cyclopropylene)-oxy-1,2-xylylene],
poly[oxy-methylenebis(1,2-cyclopropylene)-oxy-1,3-xylylene],
poly[oxy-methylenebis(1,2-cyclopropylene)-oxy-1,4-xylylene],
poly[oxy-methylenebis(1,4-cycloheptylene)-oxy-ethylene],
poly[oxy-methylenebis(1,4-cycloheptylene)-oxy-butylene],
poly[oxy-methylenebis(1,4-cycloheptylene)-oxy-hexylene],
poly[oxy-methylenebis(1,4-cycloheptylene)-oxy-decylene],
poly[oxy-methylenebis(1,4-cycloheptylene)-oxy-dodecylene],
poly[oxy-methylenebis(1,4-cycloheptylene)-oxy-tetradecylene],
poly[oxy-methylenebis(1,4-cycloheptylene)-oxy-hexadecylene],
poly[oxy-methylenebis(1,4-cycloheptylene)-oxy-octadecylene],
poly[oxy-methylenebis(1,4-cycloheptylene)-oxy-eicosylene],
poly[oxy-methylenebis(1,4-cycloheptylene)-oxy-3,3-dimethylpentylene],
poly[oxy-methylenebis(1,4-cycloheptylene)-oxy-3,3-dichlorohexylene],
poly[oxy-methylenebis(1,4-cycloheptylene)-oxy-4-phenylheptylene],
poly[oxy-methylenebis(1,4-cycloheptylene)-oxy-4-ethoxycarbonyloctylene],
poly[oxy-methylenebis(1,4-cycloheptylene)-oxy-5-nitrododecylene],
poly[oxy-methylenebis(1,4-cycloheptylene)-oxy-7-cyanohexadecylene],
poly[oxy-methylenebis(1,4-cycloheptylene)-oxy-1,2-cyclohexylene],
poly[oxy-methylenebis(1,4-cycloheptylene)-oxy-1,2-phenylene],
poly[oxy-methylenebis(1,4-cycloheptylene)-oxy-1,3-phenylene],
poly[oxy-methylenebis(1,4-cycloheptylene)-oxy-1,4-phenylene],
poly[oxy-methylenebis(1,4-cycloheptylene)-oxy-1,2-xylylene],
poly[oxy-methylenebis(1,4-cycloheptylene)-oxy-1,3-xylylene],
poly[oxy-methylenebis(1,4-cycloheptylene)-oxy-1,4-xylylene],
poly[oxy-1,2-ethylenebis(1,3-cyclopentylene)-oxy-ethylene],
poly[oxy-1,2-ethylenebis(1,3-cyclopentylene)-oxy-butylene],
poly[oxy-1,2-ethylenebis(1,3-cyclopentylene)-oxy-hexylene],
poly[oxy-1,2-ethylenebis(1,3-cyclopentylene)-oxy-decylene],
poly[oxy-1,2-ethylenebis(1,3-cyclopentylene)-oxy-dodecylene],
poly[oxy-1,2-ethylenebis(1,3-cyclopentylene)-oxy-tetradecylene],
poly[oxy-1,2-ethylenebis(1,3-cyclopentylene)-oxy-hexadecylene],
poly[oxy-1,2-ethylenebis(1,3-cyclopentylene)-oxy-octadecylene],
poly[oxy-1,2-ethylenebis(1,3-cyclopentylene)-oxy-eicosylene],
poly[oxy-1,2-ethylenebis(1,3-cyclopentylene)-oxy-3,3-dimethylpentylene],
poly[oxy-1,2-ethylenebis(1,3-cyclopentylene)-oxy-3,3-dichlorohexylene],
poly[oxy-1,2-ethylenebis(1,3-cyclopentylene)-oxy-4-phenylheptylene],
poly[oxy-1,2-ethylenebis(1,3-cyclopentylene)-oxy-4-ethoxycarbonyloctylene],
poly[oxy-1,2-ethylenebis(1,3-cyclopentylene)-oxy-5-nitrododecylene],
poly[oxy-1,2-ethylenebis(1,3-cyclopentylene)-oxy-7-cyanohexadecylene],
poly[oxy-1,2-ethylenebis(1,3-cyclopentylene)-oxy-1,2-cyclohexylene],
poly[oxy-1,2-ethylenebis(1,3-cyclopentylene)-oxy-1,2-phenylene], poly[oxy-1,2-ethylenebis(1,3-cyclopentylene)-oxy-1,3-phenylene],
poly[oxy-1,2-ethylenebis(1,3-cyclopentylene)-oxy-1,4-phenylene],
poly[oxy-1,2-ethylenebis(1,3-cyclopentylene)-oxy-1,2-xylylene],
poly[oxy-1,2-ethylenebis(1,3-cyclopentylene)-oxy-1,3-xylylene],
poly[oxy-1,2-ethylenebis(1,3-cyclopentylene)-oxy-1,4-xylylene],
poly[oxy-1,3-propylenebis(1,4-cycloheptylene)-oxy-ethylene],
poly[oxy-1,3-propylenebis(1,4-cycloheptylene)-oxy-butylene],
poly[oxy-1,3-propylenebis(1,4-cycloheptylene)-oxy-hexylene],
poly[oxy-1,3-propylenebis(1,4-cycloheptylene)-oxy-decylene],
poly[oxy-1,3-propylenebis(1,4-cycloheptylene)-oxy-dodecylene],
poly[oxy-1,3-propylenebis(1,4-cycloheptylene)-oxy-tetradecylene],
poly[oxy-1,3-propylenebis(1,4-cycloheptylene)-oxy-hexadecylene],
poly[oxy-1,3-propylenebis(1,4-cycloheptylene)-oxy-octadecylene],
poly[oxy-1,3-propylenebis(1,4-cycloheptylene)-oxy-eicosylene],
poly[oxy-1,3-propylenebis(1,4-cycloheptylene)-oxy-3,3-dimethylpentylene],
poly[oxy-1,3-propylenebis(1,4-cycloheptylene)-oxy-3,3-dichlorohexylene],
poly[oxy-1,3-propylenebis(1,4-cycloheptylene)-oxy-4-phenylheptylene],
poly[oxy-1,3-propylenebis(1,4-cycloheptylene)-oxy-4-ethoxycarbonyloctylene],
poly[oxy-1,3-propylenebis(1,4-cycloheptylene)-oxy-5-nitrododecylene],
poly[oxy-1,3-propylenebis(1,4-cycloheptylene)-oxy-7-cyanohexadecylene],
poly[oxy-1,3-propylenebis(1,4-cycloheptylene)-oxy-1,2-cyclohexylene],
poly[oxy-1,3-propylenebis(1,4-cycloheptylene)-oxy-1,2-phenylene],
poly[oxy-1,3-propylenebis(1,4-cycloheptylene)-oxy-1,3-phenylene],
poly[oxy-1,3-propylenebis(1,4-cycloheptylene)-oxy-1,4-phenylene],
poly[oxy-1,3-propylenebis(1,4-cycloheptylene)-oxy-1,2-xylylene],
poly[oxy-1,3-propylenebis(1,4-cycloheptylene)-oxy-1,3-xylylene],
poly[oxy-1,3-propylenebis(1,4-cycloheptylene)-oxy-1,4-xylylene],
poly[oxy-2-methyl-1,3-propylenebis(1,3-cyclopentylene)-oxy-ethylene],
poly[oxy-2-methyl-1,3-propylenebis(1,3-cyclopentylene)-oxy-butylene],
poly[oxy-2-methyl-1,3-propylenebis(1,3-cyclopentylene)-oxy-hexylene],
poly[oxy-2-methyl-1,3-propylenebis(1,3-cyclopentylene)-oxy-decylene],
poly[oxy-2-methyl-1,3-propylenebis(1,3-cyclopentylene)-oxy-dodecylene],
poly[oxy-2-methyl-1,3-propylenebis(1,3-cyclopentylene)-oxy-tetradecylene],
poly[oxy-2-methyl-1,3-propylenebis(1,3-cyclopentylene)-oxy-hexadecylene],
poly[oxy-2-methyl-1,3-propylenebis(1,3-cyclopentylene)-oxy-octadecylene],
poly[oxy-2-methyl-1,3-propylenebis(1,3-cyclopentylene)-oxy-eicosylene],
poly[oxy-2-methyl-1,3-propylenebis(1,3-cyclopentylene)-oxy-3,3-dimethylpentylene],
poly[oxy-2-methyl-1,3-propylenebis(1,3-cyclopentylene)-oxy-3,3-dichlorohexylene],
poly[oxy-2-methyl-1,3-propylenebis(1,3-cyclopentylene)-oxy-4-phenylheptylene],
poly[oxy-2-methyl-1,3-propylenebis(1,3-cyclopentylene)-oxy-4-ethoxycarbonyloctylene],
poly[oxy-2-methyl-1,3-propylenebis(1,3-cyclopentylene)-oxy-5-nitrododecylene],
poly[oxy-2-methyl-1,3-propylenebis(1,3-cyclopentylene)-oxy-7-cyanohexadecylene],
poly[oxy-2-methyl-1,3-propylenebis(1,3-cyclopentylene)-oxy-1,2-cyclohexylene],
poly[oxy-2-methyl-1,3-propylenebis(1,3-cyclopentylene)-oxy-1,2-phenylene],
poly[oxy-2-methyl-1,3-propylenebis(1,3-cyclopentylene)-oxy-1,3-phenylene],
poly[oxy-2-methyl-1,3-propylenebis(1,3-cyclopentylene)-oxy-1,4-phenylene],
poly[oxy-2-methyl-1,3-propylenebis(1,3-cyclopentylene)-oxy-1,2-xylylene],
poly[oxy-2-methyl-1,3-propylenebis(1,3-cyclopentylene)-oxy-1,3-xylylene],
poly[oxy-2-methyl-1,3-propylenebis(1,3-cyclopentylene)-oxy-1,4-xylylene],
poly[oxy-2,5-bicyclo[2.2.2]octylene-oxy-ethylene],
poly[oxy-2,5-bicyclo[2.2.2]octylene-oxy-butylene],
poly[oxy-2,5-bicyclo[2.2.2]octylene-oxy-hexylene],
poly[oxy-2,5-bicyclo[2.2.2]octylene-oxy-decylene],
poly[oxy-2,5-bicyclo[2.2.2]octylene-oxy-dodecylene],
poly[oxy-2,5-bicyclo[2.2.2]octylene-oxy-tetradecylene],
poly[oxy-2,5-bicyclo[2.2.2]octylene-oxy-hexadecylene],
poly[oxy-2,5-bicyclo[2.2.2]octylene-oxy-octadecylene],
poly[oxy-2,5-bicyclo[2.2.2]octylene-oxy-eicosylene],
poly[oxy-2,5-bicyclo[2.2.2]octylene-oxy-3,3-dimethylpentylene],
poly[oxy-2,5-bicyclo[2.2.2]octylene-oxy-3,3-dichlorohexylene],
poly[oxy-2,5-bicyclo[2.2.2]octylene-oxy-4-phenylheptylene],
poly[oxy-2,5-bicyclo[2.2.2]octylene-oxy-4-ethoxycarbonyloctylene],
poly[oxy-2,5-bicyclo[2.2.2]octylene-oxy-5-nitrododecylene],
poly[oxy-2,5-bicyclo[2.2.2]octylene-oxy-7-cyanohexadecylene],
poly[oxy-2,5-bicyclo[2.2.2]octylene-oxy-1,2-cyclohexylene],
poly[oxy-2,5-bicyclo[2.2.2]octylene-oxy-1,2-phenylene],
poly[oxy-2,5-bicyclo[2.2.2]octylene-oxy-1,3-phenylene],
poly[oxy-2,5-bicyclo[2.2.2]octylene-oxy-1,4-phenylene],
poly[oxy-2,5-bicyclo[2.2.2]octylene-oxy-1,2-xylylene],
poly[oxy-2,5-bicyclo[2.2.2]octylene-oxy-1,3-xylylene],
poly[oxy-2,5-bicyclo[2.2.2]octylene-oxy-1,4-xylylene],
poly[oxy-2,6-bicyclo[2.2.2]octylene-oxy-ethylene],
poly[oxy-2,6-bicyclo[2.2.2]octylene-oxy-butylene],
poly[oxy-2,6-bicyclo[2.2.2]octylene-oxy-hexylene],
poly[oxy-2,6-bicyclo[2.2.2]octylene-oxy-decylene],
poly[oxy-2,6-bicyclo[2.2.2]octylene-oxy-dodecylene],
poly[oxy-2,6-bicyclo[2.2.2]octylene-oxy-tetradecylene], poly[oxy-2,6-bicyclo[2.2.2]octylene-oxy-hexadecylene],
poly[oxy-2,6-bicyclo[2.2.2]octylene-oxy-octadecylene],
poly[oxy-2,6-bicyclo[2.2.2]octylene-oxy-eicosylene],
poly[oxy-2,6-bicyclo[2.2.2]octylene-oxy-3,3-dimethylpentylene],
poly[oxy-2,6-bicyclo[2.2.2]octylene-oxy-3,3-dichlorohexylene],
poly[oxy-2,6-bicyclo[2.2.2]octylene-oxy-4-phenylheptylene],
poly[oxy-2,6-bicyclo[2.2.2]octylene-oxy-4-ethoxycarbonyloctylene],
poly[oxy-2,6-bicyclo[2.2.2]octylene-oxy-5-nitrododecylene],
poly[oxy-2,6-bicyclo[2.2.2]octylene-oxy-7-cyanohexadecylene],
poly[oxy-2,6-bicyclo[2.2.2]octylene-oxy-1,2-cyclohexylene],
poly[oxy-2,6-bicyclo[2.2.2]octylene-oxy-1,2-phenylene],
poly[oxy-2,6-bicyclo[2.2.2]octylene-oxy-1,3-phenylene],
poly[oxy-2,6-bicyclo[2.2.2]octylene-oxy-1,4-phenylene],
poly[oxy-2,6-bicyclo[2.2.2]octylene-oxy-1,2-xylylene],
poly[oxy-2,6-bicyclo[2.2.2]octylene-oxy-1,3-xylylene],
poly[oxy-2,6-bicyclo[2.2.2]octylene-oxy-1,4-xylylene],
poly[oxy-2,5-bicyclo[4.3.2]undecylene-oxy-ethylene],
poly[oxy-2,5-bicyclo[4.3.2]undecylene-oxy-butylene],
poly[oxy-2,5-bicyclo[4.3.2]undecylene-oxy-hexylene],
poly[oxy-2,5-bicyclo[4.3.2]undecylene-oxy-decylene],
poly[oxy-2,5-bicyclo[4.3.2]undecylene-oxy-dodecylene],
poly[oxy-2,5-bicyclo[4.3.2]undecylene-oxy-tetradecylene],
poly[oxy-2,5-bicyclo[4.3.2]undecylene-oxy-hexadecylene],
poly[oxy-2,5-bicyclo[4.3.2]undecylene-oxy-octadecylene],
poly[oxy-2,5-bicyclo[4.3.2]undecylene-oxy-eicosylene],
poly[oxy-2,5-bicyclo[4.3.2]undecylene-oxy-3,3-dimethylpentylene],
poly[oxy-2,5-bicyclo[4.3.2]undecylene-oxy-3,3-dichlorohexylene],
poly[oxy-2,5-bicyclo[4.3.2]undecylene-oxy-4-phenylheptylene],
poly[oxy-2,5-bicyclo[4.3.2]undecylene-oxy-4-ethoxycarbonyloctylene],
poly[oxy-2,5-bicyclo[4.3.2]undecylene-oxy-5-nitrododecylene],
poly[oxy-2,5-bicyclo[4.3.2]undecylene-oxy-7-cyanohexadecylene],
poly[oxy-2,5-bicyclo[4.3.2]undecylene-oxy-1,2-cyclohexylene],
poly[oxy-2,5-bicyclo[4.3.2]undecylene-oxy-1,2-phenylene],
poly[oxy-2,5-bicyclo[4.3.2]undecylene-oxy-1,3-phenylene],
poly[oxy-2,5-bicyclo[4.3.2]undecylene-oxy-1,4-phenylene],
poly[oxy-2,5-bicyclo[4.3.2]undecylene-oxy-1,2-xylylene],
poly[oxy-2,5-bicyclo[4.3.2]undecylene-oxy-1,3-xylylene],
poly[oxy-2,5-bicyclo[4.3.2]undecylene-oxy-1,4-xylylene],
poly[oxy-2,5-bicyclo[5.5.5]heptadecylene-oxy-ethylene],
poly[oxy-2,5-bicyclo[5.5.5]heptadecylene-oxy-butylene],
poly[oxy-2,5-bicyclo[5.5.5]heptadecylene-oxy-hexylene],
poly[oxy-2,5-bicyclo[5.5.5]heptadecylene-oxy-decylene],
poly[oxy-2,5-bicyclo[5.5.5]heptadecylene-oxy-dodecylene],
poly[oxy-2,5-bicyclo[5.5.5]heptadecylene-oxy-tetradecylene],
poly[oxy-2,5-bicyclo[5.5.5]heptadecylene-oxy-hexadecylene],
poly[oxy-2,5-bicyclo[5.5.5]heptadecylene-oxy-octadecylene],
poly[oxy-2,5-bicyclo[5.5.5]heptadecylene-oxy-eicosylene],
poly[oxy-2,5-bicyclo[5.5.5]heptadecylene-oxy-3,3-dimethylpentylene],
poly[oxy-2,5-bicyclo[5.5.5]heptadecylene-oxy-3,3-dichlorohexylene],
poly[oxy-2,5-bicyclo[5.5.5]heptadecylene-oxy-4-phenylheptylene],
poly[oxy-2,5-bicyclo[5.5.5]heptadecylene-oxy-4-ethoxycarbonyloctylene],
poly[oxy-2,5-bicyclo[5.5.5]heptadecylene-oxy-5-nitrododecylene],
poly[oxy-2,5-bicyclo[5.5.5]heptadecylene-oxy-7-cyanohexadecylene],
poly[oxy-2,5-bicyclo[5.5.5]heptadecylene-oxy-1,2-cyclohexylene],
poly[oxy-2,5-bicyclo[5.5.5]heptadecylene-oxy-1,2-phenylene],
poly[oxy-2,5-bicyclo[5.5.5]heptadecylene-oxy-1,3-phenylene],
poly[oxy-2,5-bicyclo[5.5.5]heptadecylene-oxy-1,4-phenylene],
poly[oxy-2,5-bicyclo[5.5.5]heptadecylene-oxy-1,2-xylylene],
poly[oxy-2,5-bicyclo[5.5.5]heptadecylene-oxy-1,3-xylylene], and
poly[oxy-2,5-bicyclo[5.5.5]heptadecylene-oxy-1,4-xylylene].

The polyether polymer of the present invention is more preferably a polyether polymer, wherein $R^1$ in the formula [1] is an alicyclic hydrocarbyl group represented by the following formula [2] or [3]:

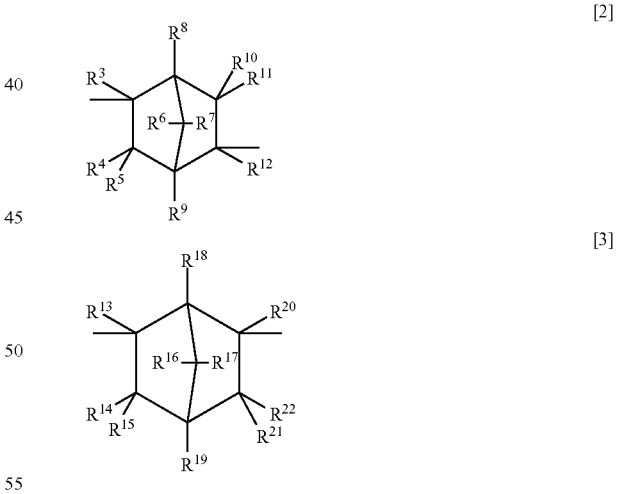

wherein $R^3$ to $R^{12}$ in the formula [2] and $R^{13}$ to $R^{22}$ in the formula [3] are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having 1 to 10 carbon atoms, and the above alkyl, alkoxy, alkoxycarbonyl, alkylthio and alkylsilyl groups may be substituted with a halogen atom or an aryl group, respectively.

More preferable examples of the polyether polymer of the present invention are as follows, represented by the formula [2]:

poly[oxy-2,5-bicyclo[2.2.1]heptylene-oxy-ethylene],
poly[oxy-2,5-bicyclo[2.2.1]heptylene-oxy-butylene],
poly[oxy-2,5-bicyclo[2.2.1]heptylene-oxy-hexylene],
poly[oxy-2,5-bicyclo[2.2.1]heptylene-oxy-decylene],
poly[oxy-2,5-bicyclo[2.2.1]heptylene-oxy-dodecylene],
poly[oxy-2,5-bicyclo[2.2.1]heptylene-oxy-tetradecylene],
poly[oxy-2,5-bicyclo[2.2.1]heptylene-oxy-hexadecylene],
poly[oxy-2,5-bicyclo[2.2.1]heptylene-oxy-octadecylene],
poly[oxy-2,5-bicyclo[2.2.1]heptylene-oxy-eicosylene],
poly[oxy-2,5-bicyclo[2.2.1]heptylene-oxy-3,3-dimethylpentylene],
poly[oxy-2,5-bicyclo[2.2.1]heptylene-oxy-3,3-dichlorohexylene],
poly[oxy-2,5-bicyclo[2.2.1]heptylene-oxy-4-phenylheptylene],
poly[oxy-2,5-bicyclo[2.2.1]heptylene-oxy-4-ethoxycarbonyloctylene],
poly[oxy-2,5-bicyclo[2.2.1]heptylene-oxy-5-nitrododecylene],
poly[oxy-2,5-bicyclo[2.2.1]heptylene-oxy-7-cyanohexadecylene],
poly[oxy-2,5-bicyclo[2.2.1]heptylene-oxy-1,2-cyclohexylene],
poly[oxy-2,5-bicyclo[2.2.1]heptylene-oxy-1,2-phenylene],
poly[oxy-2,5-bicyclo[2.2.1]heptylene-oxy-1,3-phenylene],
poly[oxy-2,5-bicyclo[2.2.1]heptylene-oxy-1,4-phenylene],
poly[oxy-2,5-bicyclo[2.2.1]heptylene-oxy-1,2-xylylene],
poly[oxy-2,5-bicyclo[2.2.1]heptylene-oxy-1,3-xylylene],
poly[oxy-2,5-bicyclo[2.2.1]heptylene-oxy-1,4-xylylene],
poly[oxy-7,7-dimethyl-2,5-bicyclo[2.2.1]heptylene-oxy-ethylene],
poly[oxy-7,7-dimethyl-2,5-bicyclo[2.2.1]heptylene-oxy-butylene],
poly[oxy-7,7-dimethyl-2,5-bicyclo[2.2.1]heptylene-oxy-hexylene],
poly[oxy-7,7-dimethyl-2,5-bicyclo[2.2.1]heptylene-oxy-decylene],
poly[oxy-7,7-dimethyl-2,5-bicyclo[2.2.1]heptylene-oxy-dodecylene],
poly[oxy-7,7-dimethyl-2,5-bicyclo[2.2.1]heptylene-oxy-tetradecylene],
poly[oxy-7,7-dimethyl-2,5-bicyclo[2.2.1]heptylene-oxy-hexadecylene],
poly[oxy-7,7-dimethyl-2,5-bicyclo[2.2.1]heptylene-oxy-octadecylene],
poly[oxy-7,7-dimethyl-2,5-bicyclo[2.2.1]heptylene-oxy-eicosylene],
poly[oxy-7,7-dimethyl-2,5-bicyclo[2.2.1]heptylene-oxy-3,3-dimethylpentylene],
poly[oxy-7,7-dimethyl-2,5-bicyclo[2.2.1]heptylene-oxy-3,3-dichlorohexylene],
poly[oxy-7,7-dimethyl-2,5-bicyclo[2.2.1]heptylene-oxy-4-phenylheptylene],
poly[oxy-7,7-dimethyl-2,5-bicyclo[2.2.1]heptylene-oxy-4-ethoxycarbonyloctylene],
poly[oxy-7,7-dimethyl-2,5-bicyclo[2.2.1]heptylene-oxy-5-nitrododecylene],
poly[oxy-7,7-dimethyl-2,5-bicyclo[2.2.1]heptylene-oxy-7-cyanohexadecylene],
poly[oxy-7,7-dimethyl-2,5-bicyclo[2.2.1]heptylene-oxy-1,2-cyclohexylene],
poly[oxy-7,7-dimethyl-2,5-bicyclo[2.2.1]heptylene-oxy-1,2-phenylene],
poly[oxy-7,7-dimethyl-2,5-bicyclo[2.2.1]heptylene-oxy-1,3-phenylene],
poly[oxy-7,7-dimethyl-2,5-bicyclo[2.2.1]heptylene-oxy-1,4-phenylene],
poly[oxy-7,7-dimethyl-2,5-bicyclo[2.2.1]heptylene-oxy-1,2-xylylene],
poly[oxy-7,7-dimethyl-2,5-bicyclo[2.2.1]heptylene-oxy-1,3-xylylene],
poly[oxy-7,7-dimethyl-2,5-bicyclo[2.2.1]heptylene-oxy-1,4-xylylene],
poly[oxy-7,7-dichloro-2,5-bicyclo[2.2.1]heptylene-oxy-ethylene],
poly[oxy-7,7-dichloro-2,5-bicyclo[2.2.1]heptylene-oxy-butylene],
poly[oxy-7,7-dichloro-2,5-bicyclo[2.2.1]heptylene-oxy-hexylene],
poly[oxy-7,7-dichloro-2,5-bicyclo[2.2.1]heptylene-oxy-decylene],
poly[oxy-7,7-dichloro-2,5-bicyclo[2.2.1]heptylene-oxy-dodecylene],
poly[oxy-7,7-dichloro-2,5-bicyclo[2.2.1]heptylene-oxy-tetradecylene],
poly[oxy-7,7-dichloro-2,5-bicyclo[2.2.1]heptylene-oxy-hexadecylene],
poly[oxy-7,7-dichloro-2,5-bicyclo[2.2.1]heptylene-oxy-octadecylene],
poly[oxy-7,7-dichloro-2,5-bicyclo[2.2.1]heptylene-oxy-eicosylene],
poly[oxy-7,7-dichloro-2,5-bicyclo[2.2.1]heptylene-oxy-3,3-dimethylpentylene],
poly[oxy-7,7-dichloro-2,5-bicyclo[2.2.1]heptylene-oxy-3,3-dichlorohexylene],
poly[oxy-7,7-dichloro-2,5-bicyclo[2.2.1]heptylene-oxy-4-phenylheptylene],
poly[oxy-7,7-dichloro-2,5-bicyclo[2.2.1]heptylene-oxy-4-ethoxycarbonyloctylene],
poly[oxy-7,7-dichloro-2,5-bicyclo[2.2.1]heptylene-oxy-5-nitrododecylene],
poly[oxy-7,7-dichloro-2,5-bicyclo[2.2.1]heptylene-oxy-7-cyanohexadecylene],
poly[oxy-7,7-dichloro-2,5-bicyclo[2.2.1]heptylene-oxy-1,2-cyclohexylene],
poly[oxy-7,7-dichloro-2,5-bicyclo[2.2.1]heptylene-oxy-1,2-phenylene],
poly[oxy-7,7-dichloro-2,5-bicyclo[2.2.1]heptylene-oxy-1,3-phenylene],
poly[oxy-7,7-dichloro-2,5-bicyclo[2.2.1]heptylene-oxy-1,4-phenylene],
poly[oxy-7,7-dichloro-2,5-bicyclo[2.2.1]heptylene-oxy-1,2-xylylene],
poly[oxy-7,7-dichloro-2,5-bicyclo[2.2.1]heptylene-oxy-1,3-xylylene], and
poly[oxy-7,7-dichloro-2,5-bicyclo[2.2.1]heptylene-oxy-1,4-xylylene].

More preferable examples of the polyether polymer of the present invention are as follows, represented by the formula [3]:

poly[oxy-2,6-bicyclo[2.2.1]heptylene-oxy-ethylene],
poly[oxy-2,6-bicyclo[2.2.1]heptylene-oxy-butylene],
poly[oxy-2,6-bicyclo[2.2.1]heptylene-oxy-hexylene],
poly[oxy-2,6-bicyclo[2.2.1]heptylene-oxy-decylene],
poly[oxy-2,6-bicyclo[2.2.1]heptylene-oxy-dodecylene],
poly[oxy-2,6-bicyclo[2.2.1]heptylene-oxy-tetradecylene],
poly[oxy-2,6-bicyclo[2.2.1]heptylene-oxy-hexadecylene],
poly[oxy-2,6-bicyclo[2.2.1]heptylene-oxy-octadecylene],
poly[oxy-2,6-bicyclo[2.2.1]heptylene-oxy-eicosylene], poly[oxy-2,6-bicyclo[2.2.1]heptylene-oxy-3,3-dimethyl-pentylene],
poly[oxy-2,6-bicyclo[2.2.1]heptylene-oxy-3,3-dichloro-hexylene],
poly[oxy-2,6-bicyclo[2.2.1]heptylene-oxy-4-phenylheptylene],
poly[oxy-2,6-bicyclo[2.2.1]heptylene-oxy-4-ethoxycarbonyloctylene],
poly[oxy-2,6-bicyclo[2.2.1]heptylene-oxy-5-nitrododecylene],
poly[oxy-2,6-bicyclo[2.2.1]heptylene-oxy-7-cyanohexadecylene],
poly[oxy-2,6-bicyclo[2.2.1]heptylene-oxy-1,2-cyclohexylene],
poly[oxy-2,6-bicyclo[2.2.1]heptylene-oxy-1,2-phenylene],
poly[oxy-2,6-bicyclo[2.2.1]heptylene-oxy-1,3-phenylene],
poly[oxy-2,6-bicyclo[2.2.1]heptylene-oxy-1,4-phenylene],
poly[oxy-2,6-bicyclo[2.2.1]heptylene-oxy-1,2-xylylene], and
poly[oxy-2,6-bicyclo[2.2.1]heptylene-oxy-1,3-xylylene].

The polyether polymer of the present invention is further preferably a polyether polymer, wherein $R^1$ in the formula [1] is a 2,5-bicyclo[2.2.1]heptylene group, or a 2,6-bicyclo[2.2.1]heptylene group, both groups satisfying the above formula [2] or [3].

Further preferable examples of the polyether polymer of the present invention are as follows:
poly[oxy-2,5-bicyclo[2.2.1]heptylene-oxy-hexylene],
poly[oxy-2,5-bicyclo[2.2.1]heptylene-oxy-1,3-phenylene],
poly[oxy-2,5-bicyclo[2.2.1]heptylene-oxy-1,4-phenylene],
poly[oxy-2,5-bicyclo[2.2.1]heptylene-oxy-1,4-xylylene],
poly[oxy-2,5-bicyclo[2.2.1]heptylene-oxy-biphenyl-4,4'-diyl],
poly[oxy-2,5-bicyclo[2.2.1]heptylene-oxy-fluorene-9,9-bis(1,4-xylylene)],
poly[oxy-2,5-bicyclo[2.2.1]heptylene-oxy-4,4'-sulfonyldiphenylene],
poly[oxy-2,5-bicyclo[2.2.1]heptylene-oxy-4,4'-thiodiphenylele],
poly[oxy-2,5-bicyclo[2.2.1]heptylene-oxy-hexafluoropropane-2,2-bis(1,4-phenylene)],
poly[oxy-2,6-bicyclo[2.2.1]heptylene-oxy-hexylene],
poly[oxy-2,6-bicyclo[2.2.1]heptylene-oxy-1,3-phenylene],
poly[oxy-2,6-bicyclo[2.2.1]heptylene-oxy-1,4-phenylene],
poly[oxy-2,6-bicyclo[2.2.1]heptylene-oxy-1,4-xylylene],
poly[oxy-2,6-bicyclo[2.2.1]heptylene-oxy-biphenyl-4,4'-diyl],
poly[oxy-2,6-bicyclo[2.2.1]heptylene-oxy-fluorene-9,9-bis(1,4-xylylene)],
poly[oxy-2,6-bicyclo[2.2.1]heptylene-oxy-4,4'-sulfonyldiphenylene],
poly[oxy-2,6-bicyclo[2.2.1]heptylene-oxy-4,4'-thiodiphenylele], and
poly[oxy-2,6-bicyclo[2.2.1]heptylene-oxy-hexafluoropropane-2,2-bis(1,4-phenylene)].

The monomer (A) in the present invention may be a compound known in the art. The monomer (A) is preferably compounds represented by the following formula [4], and two or more of those compounds may be combined with one another:

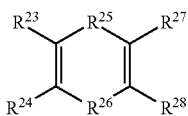

[4]

wherein $R^{23}$, $R^{24}$, $R^{27}$ and $R^{28}$ are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having having 1 to 10 carbon atoms, and the above alkyl, alkoxy, alkoxycarbonyl, alkylthio and alkylsilyl groups may be substituted with a halogen atom or an aryl group; $R^{25}$ and $R^{26}$ are independently of each other a hydrocabyl group having 1 or more carbon atoms, which may have a substituent; the number of the atoms contained in the cyclic skeleton consisting of $R^{25}$, $R^{26}$ and four carbon atoms between $R^{25}$ and $R^{26}$ is 6 to 20; and $R^{25}$ and $R^{26}$ may be linked with each other directly or through an atom or an atomic group.

Examples of the compound represented by the formula [4] are as follows:
1,3-cyclohexadiene, 1,4-cyclohexadiene, 1,3-cyclooctadiene, 1,4-cyclooctadiene, 1,5-cyclooctadiene, 1,3-cyclodecadiene, 1,-cyclodecadiene, 1,5-cyclodecadiene, 1,6-cyclodecadiene, 1,3-cyclododecadiene, 1,4-cyclododecadiene, 1,5-cyclododecadiene, 1,6-cyclododecadiene, 1,7-cyclododecadiene, 1,3-cyclotetradecadiene, 1,4-cyclotetradecadiene, 1,5-cyclotetradecadiene, 1,6-cyclotetradecadiene, 1,7-cyclotetradecadiene, 1,8-cyclotetradecadiene, 1,3-cyclohexadecadiene, 1,4-cyclohexadecadiene, 1,5-cyclohexadecadiene, 1,6-cyclohexadecadiene, 1,7-cyclohexadecadiene, 1,8-cyclohexadecadiene, 1,9-cyclohexadecadiene, 1,3-cyclooctadecadiene, 1,4-cyclooctadecadiene, 1,5-cyclooctadecadiene, 1,6-cyclooctadecadiene, 1,7-cyclooctadecadiene, 1,8-cyclooctadecadiene, 1,9-cyclooctadecadiene, 1,10-cyclooctadecadiene, 1,3-cycloeicosadiene, 1,4-cycloeicosadiene, 1,5-cycloeicosadiene, 1,6-cycloeicosadiene, 1,7-cycloeicosadiene, 1,8-cycloeicosadiene, 1,9-cycloeicosadiene, 1,10-cycloeicosadiene, 1,11-cycloeicosadiene, 1-methyl-2,5-cyclohexadiene, 1-ethyl-2,5-cyclohexadiene, 1-propyl-2,5-cyclohexadiene, 1-butyl-2,5-cyclohexadiene, 1-pentyl-2,5-cyclohexadiene, 1-hexyl-2,5-cyclohexadiene, 1-heptyl-2,5-cyclohexadiene, 1-octyl-2,5-cyclohexadiene, 1-nonyl-2,5-cyclohexadiene, 1-decyl-2,5-cyclohexadiene, 1-(tert-butyl)-2,5-cyclohexadiene, 1,4-dimethyl-2,5-cyclohexadiene, 1,4-diethyl-2,5-cyclohexadiene, 1,4-dipropyl-2,5-cyclohexadiene, 1,4-dibutyl-2,5-cyclohexadiene, 1,4-dipentyl-2,5-cyclohexadiene, 1,4-dihexyl-2,5-cyclohexadiene, 1,4-diheptyl-2,5-cyclohexadiene, 1,4-dioctyl-2,5-cyclohexadiene, 1,4-dinonyl-2,5-cyclohexadiene, 1,4-didecyl-2,5-cyclohexadiene, 1,4-bis(tert-butyl)-2,5-cyclohexadiene, 2-fluoromethyl-2,5-cyclohexadiene, 1-difluoromethyl-2,5-cyclohexadiene, 1-trifluoromethyl-2,5-cyclohexadiene, 1-chloromethyl-2,5-cyclohexadiene, 1-dichloromethyl-2,5-cyclohexadiene, 1-trichloromethyl-2,5-cyclohexadiene, 1-bromomethyl-2,5-cyclohexadiene, 1-dibromomethyl-2,5-cyclohexadiene, 1-tribromomethyl-2,5-cyclohexadiene, 1,4-bis(fluoromethyl)-2,5-cyclohexadiene, 1,4-bis(difluoromethyl)-2,5-cyclohexadiene, 1,4-bis(trifluoromethyl)-2,5-cyclohexadiene, 1,4-bis(chloromethyl)-2,5-cyclohexadiene, 1,4-bis(dichloromethyl)-2,5-cyclohexadiene, 1,4-bis(trichloromethyl)-2,5-cyclohexadiene, 1,4-bis(bromomethyl)-2,5-cyclohexadiene, 1,4-bis(dibromomethyl)-2,5-cyclohexadiene, 1,4-bis(tribromomethyl)-2,5-cyclohexadiene, 1-(1-fluoroethyl)-2,5-cyclohexadiene, 1-(2-fluoroethyl)-2,5-cyclohexadiene, 1-(1,2-difluoroethyl)-2,5-cyclohexadiene, 1-(1,1,2,2,2-pentafluoroethyl)-2,5-cyclohexadiene, 1-(1-fluorobutyl)-2,5-cyclohexadiene, 1-(2-fluorobutyl)-2,5-cyclohexadiene, 1-(1,2,3,4-tetrafluorobutyl)-2,5-cyclohexadiene, 1-(1,1,2,2,3,3,4,4,4-decafluorobutyl)-2,5-cyclohexadiene, 1-(1-chloroethyl)-2,5-cyclohexadiene, 1-(2-chloroethyl)-2,5-cyclohexadiene, 1-(1,2-dichloroethyl)-2,5-cyclohexadiene, 1-(1,1,2,2,2-pentachloroethyl)-2,5-cyclohexadiene, 1-(1-chlorobutyl)-2,5-cyclohexadiene, 1-(2-chlorobutyl)-2,5-cyclohexadiene, 1-(1,2,3,4-tetrachlorobutyl)-2,5-cyclohexadiene, 1-(1,1,2,2,3,3,4,4,4-decachlorobutyl)-2,5-cyclohexadiene, 1-(1-bromoethyl)-2,5-cyclohexadiene, 1-(2-bromoethyl)-2,5-cyclohexadiene, 1-(1,2-dibromoethyl)-2,5-cyclohexadiene, 1-(1,1,2,2,2-pentabromoethyl)-2,5-cyclohexadiene, 1-(1-bromobutyl)-2,5-cyclohexadiene, 1-(2-bromobutyl)-2,5-cyclohexadiene, 1-(1,2,3,4-tetrabromobutyl)-2,5-cyclohexadiene, 1-(1,1,2,2,3,3,4,4,4-decabromobutyl)-2,5-cyclohexadiene, 1,4-bis(1-fluoroethyl)-2,5-cyclohexadiene, 1,4-bis(2-fluoroethyl)-2,5-cyclohexadiene, 1,4-bis(1,2-difluoroethyl)-2,5-cyclohexadiene, 1,4-bis(1,1,2,2,2-pentafluoroethyl)-2,5-cyclohexadiene, 1,4-bis(1-fluorobutyl)-2,5-cyclohexadiene, 1,4-bis(2-fluorobutyl)-2,5-cyclohexadiene, 1,4-bis(1,2,3,4-tetrafluorobutyl)-2,5-cyclohexadiene, 1,4-bis(1,1,2,2,3,3,4,4,4-decafluorobutyl)-2,5-cyclohexadiene, 1,4-bis(1-chloroethyl)-2,5-cyclohexadiene, 1,4-bis(2-chloroethyl)-2,5-cyclohexadiene, 1,4-bis(1,2-dichloroethyl)-2,5-cyclohexadiene, 1,4-bis(1,1,2,2,2-pentachloroethyl)-2,5-cyclohexadiene, 1,4-bis(1-chlorobutyl)-2,5-cyclohexadiene, 1,4-bis(2-chlorobutyl)-2,5-cyclohexadiene, 1,4-bis(1,2,3,4-tetrachlorobutyl)-2,5-cyclohexadiene, 1,4-bis(1,1,2,2,3,3,4,4,4-decachlorobutyl)-2,5-cyclohexadiene, 1,4-bis(1-bromoethyl)-2,5-cyclohexadiene, 1,4-bis(2-bromoethyl)-2,5-cyclohexadiene, 1,4-bis(1,2-dibromoethyl)-2,5-cyclohexadiene, 1,4-bis(1,1,2,2,2-pentabromoethyl)-2,5-cyclohexadiene, 1,4-bis(1-bromobutyl)-2,5-cyclohexadiene, 1,4-bis(2-bromobutyl)-2,5-cyclohexadiene, 1,4-bis(1,2,3,4-tetrabromobutyl)-2,5-cyclohexadiene, 1,4-bis(1,1,2,2,3,3,4,4,4-decabromobutyl)-2,5-cyclohexadiene, 1-phenyl-2,5-cyclohexadiene, 1,4-diphenyl-2,5-cyclohexadiene, 1-benzyl-2,5-cyclohexadiene, 1,4-dibenzyl-2,5-cyclohexadiene, 1-(4-methylphenyl)-2,5-cyclohexadiene, 1,4-bis(4-methylphenyl)-2,5-cyclohexadiene, 1-methyloxy-2,5-cyclohexadiene, 1-ethyloxy-2,5-cyclohexadiene, 1-propyloxy-2,5-cyclohexadiene, 1-butyloxy-2,5-cyclohexadiene, 1-pentyloxy-2,5-cyclohexadiene, 1-hexyloxy-2,5-cyclohexadiene, 1-heptyloxy-2,5-cyclohexadiene, 1-octyloxy-2,5-cyclohexadiene, 1-nonyloxy-2,5-cyclohexadiene, 1-decyloxy-2,5-cyclohexadiene, 1-(tert-butyloxy)-2,5-cyclohexadiene, 1,4-bis(methyloxy)-2,5-cyclohexadiene, 1,4-bis(ethyloxy)-2,5-cyclohexadiene, 1,4-bis(propyloxy)-2,5-cyclohexadiene, 1,4-bis(butyloxy)-2,5-cyclohexadiene, 1,4-bis(pentyloxy)-2,5-cyclohexadiene, 1,4-bis(hexyloxy)-2,5-cyclohexadiene, 1,4-bis(heptyloxy)-2,5-cyclohexadiene, 1,4-bis(octyloxy)-2,5-cyclohexadiene, 1,4-bis(nonyloxy)-2,5-cyclohexadiene, 1,4-bis(decyloxy)-2,5-cyclohexadiene, 1,4-bis(tert-butyloxy)-2,5-cyclohexadiene, 1-methylthio-2,5-cyclohexadiene, 1-ethylthio-2,5-cyclohexadiene, 1-propylthio-2,5-cyclohexadiene, 1-butylthio-2,5-cyclohexadiene, 1-pentylthio-2,5-cyclohexadiene, 1-hexylthio-2,5-cyclohexadiene, 1-heptylthio-2,5-cyclohexadiene, 1-octylthio-2,5-cyclohexadiene, 1-nonylthio-2,5-cyclohexadiene, 1-decylthio-2,5-cyclohexadiene, 1-(tert-butylthio)-2,5-cyclohexadiene, 1,4-bis(methylthio)-2,5-cyclohexadiene, 1,4-bis(ethylthio)-2,5-cyclohexadiene, 1,4-bis(propylthio)-2,5-cyclohexadiene, 1,4-bis(butylthio)-2,5-cyclohexadiene, 1,4-bis(pentylthio)-2,5-cyclohexadiene, 1,4-bis(hexylthio)-2,5-cyclohexadiene, 1,4-bis(heptylthio)-2,5-cyclohexadiene, 1,4-bis(octylthio)-2,5-cyclohexadiene, 1,4-bis(nonylthio)-2,5-cyclohexadiene, 1,4-bis(decylthio)-2,5-cyclohexadiene, 1,4-bis(tert-butylthio)-2,5-cyclohexadiene, 1-phenylthio-2,5-cyclohexadiene, 1,4-bis(phenylthio)-2,5-cyclohexadiene, 1-(4-methylphenylthio)-2,5-cyclohexadiene, 1,4-bis(4-methylphenylthio)-2,5-cyclohexadiene, 1-nitro-2,5-cyclohexadiene, 1,4-dinitro-2,5-cyclohexadiene, 1-cyano-2,5-cyclohexadiene, 1,4-dicyano-2,5-cyclohexadiene, 1-fluoro-2,5-cyclohexadiene, 1,4-difluoro-2,5-cyclohexadiene, 1-chloro-2,5-cyclohexadiene, 1,4-dichloro-2,5-cyclohexadiene, 1-bromo-2,5-cyclohexadiene, 1,4-dibromo-2,5-cyclohexadiene, 1-methylsilyl-2,5-cyclohexadiene, 1-ethylsilyl-2,5-cyclohexadiene, 1-propylsilyl-2,5-cyclohexadiene, 1-butylsilyl-2,5-cyclohexadiene, 1-pentylsilyl-2,5-cyclohexadiene, 1-hexylsilyl-2,5-cyclohexadiene, 1-heptylsilyl-2,5-cyclohexadiene, 1-octylsilyl-2,5-cyclohexadiene, 1-nonylsilyl-2,5-cyclohexadiene, 1-decylsilyl-2,5-cyclohexadiene, 1-(tert-butylsilyl)-2,5-cyclohexadiene, 1,4-bis(methylsilyl)-2,5-cyclohexadiene, 1,4-bis(ethylsilyl)-2,5-cyclohexadiene, 1,4-bis(propylsilyl)-2,5-cyclohexadiene, 1,4-bis(butylsilyl)-2,5-cyclohexadiene, 1,4-bis(pentylsilyl)-2,5-cyclohexadiene, 1,4-bis(hexylsilyl)-2,5-cyclohexadiene, 1,4-bis(heptylsilyl)-2,5-cyclohexadiene, 1,4-bis(octylsilyl)-2,5-cyclohexadiene, 1,4-bis(nonylsilyl)-2,5-cyclohexadiene, 1,4-bis(decylsilyl)-2,5-cyclohexadiene, 1,4-bis(tert-butylsilyl)-2,5-cyclohexadiene, 1-oxa-3,5-cyclohexadiene, 1-oxa-3,6-cyclooctadiene, 1-oxa-3,7-cyclodecadiene, 1-oxa-3,8-cyclododecadiene, 1-oxa-3,9-cyclotetradecadiene, 1-oxa-3,10-cyclohexadecadiene, 1-oxa-3,11-cyclooctadecadiene, 1-oxa-3,12-cycloeicosadiene, 1,6-dioxa-3,8-cyclodecadiene, 1-thio-3,5-cyclohexadiene, 1-thio-3,6-cyclooctadiene, 1-thio-3,7-cyclodecadiene, 1-thio-3,8-cyclododecadiene, 1-thio-3,9-cyclotetradecadiene, 1-thio-3,10-cyclohexadecadiene, 1-thio-3,11-cyclooctadecadiene, 1-thio-3,12-cycloeicosadiene, 1,6-dithio-3,8-cyclodecadiene, bicyclo[2.2.1]-hepta-2,5-diene, 1-methylbicyclo[2.2.1]-hepta-2,5-diene, 1-ethylbicyclo[2.2.1]-hepta-2,5-diene, 1-butylbicyclo[2.2.1]-hepta-2,5-diene, 1-tert-butylbicyclo[2.2.1]-hepta-2,5-diene, 1,4-dimethylbicyclo[2.2.1]-hepta-2,5-diene, 1,4-dibutylbicyclo[2.2.1]-hepta-2,5-diene, 7,7-dimethylbicyclo[2.2.1]-hepta-2,5-diene, 7,7-dibutylbicyclo[2.2.1]-hepta-2,5-diene, 7,7-difluorobicyclo[2.2.1]-hepta-2,5-diene, 7,7-dichlorobicyclo[2.2.1]-hepta-2,5-diene, bicyclo[3.2.2]-nona-2,5-diene, bicyclo[2.2.2]-nona-2,6-diene, bicyclo[4.3.2]-undeca-2,5-diene, bicyclo[4.3.2]-undeca-2,6-diene, bicyclo[4.4.3]-trideca-2,5-diene, bicyclo[4.4.3]-trideca-2,6-diene, bicyclo[5.4.4]-pentadeca-2,5-diene, bicyclo[5.4.4]-pentadeca-2,6-diene, bicyclo[5.5.5]-heptadeca-2,5-diene, bicyclo[5.5.5]-heptadeca-2,6-diene, bicyclo[6.6.5]-nonadeca-2,5-diene, and bicyclo[6.6.5]-nonadeca-2,6-diene.

The monomer (A) is more preferably a compound represented by the following formula [5]:

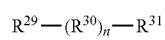

[5]

wherein $R^{29}$ and $R^{31}$ are independently of each other a cyclic hydrocarbyl group having (i) a cyclic skeleton consisting of 3 to 20 atoms, two or more atoms of those 3 to 20 atoms being carbon atoms, (ii) one carbon-to-carbon double bond, and (iii) an optional substituent; $R^{30}$ is a cross-linking group containing two or more atoms selected from the group consisting of a carbon atom, a hydrogen atom and a nitrogen atom; and n is a number of 0 or 1.

Examples of the compound represented by the formula [5] are as follows:
methylelebis(2-cyclopropylene-1-yl),
methylelebis(3-cyclopentylene-1-yl),
methylelebis(4-cycloheptylene-1-yl),
methylelebis(5-cyclononylene-1-yl),
methylelebis(6-cycloundecylene-1-yl),
methylelebis(7-cyclotridecylene-1-yl),
methylelebis(8-cyclopentadecylene-1-yl),
methylelebis(9-cycloheptadecylene-1-yl),
methylelebis(10-cyclononadecylene-1-yl),
1,2-ethylelebis(2-cyclopropylene-1-yl),
1,2-ethylelebis(3-cyclopentylene-1-yl),
1,2-ethylelebis(4-cycloheptylene-1-yl),
1,2-ethylelebis(5-cyclononylene-1-yl),
1,2-ethylelebis(6-cycloundecylene-1-yl),
1,2-ethylelebis(7-cyclotridecylene-1-yl),
1,2-ethylelebis(8-cyclopentadecylene-1-yl),
1,2-ethylelebis(9-cycloheptadecylene-1-yl),
1,2-ethylelebis(10-cyclononadecylene-1-yl),
1,3-propylenebis(2-cyclopropylene-1-yl),
1,3-propylenebis(3-cyclopentylene-1-yl),
1,3-propylenebis(4-cycloheptylene-1-yl),
1,3-propylenebis(5-cyclononylene-1-yl),
1,3-propylenebis(6-cycloundecylene-1-yl),
1,3-propylenebis(7-cyclotridecylene-1-yl),
1,3-propylenebis(8-cyclopentadecylene-1-yl),
1,3-propylenebis(9-cycloheptadecylene-1-yl),
1,3-propylenebis(10-cyclononadecylene-1-yl),
2-methyl-1,3-propylenebis(2-cyclopropylene-1-yl),
2-methyl-1,3-propylenebis(3-cyclopentylene-1-yl),
2-methyl-1,3-propylenebis(4-cycloheptylene-1-yl),
2-methyl-1,3-propylenebis(5-cyclononylene-1-yl),
2-methyl-1,3-propylenebis(6-cycloundecylene-1-yl),
2-methyl-1,3-propylenebis(7-cyclotridecylene-1-yl),
2-methyl-1,3-propylenebis(8-cyclopentadecylene-1-yl),
2-methyl-1,3-propylenebis(9-cycloheptadecylene-1-yl), and
2-methyl-1,3-propylenebis(10-cyclononadecylene-1-yl).

The monomer (A) is further preferably a compound represented by the following formula [6]:

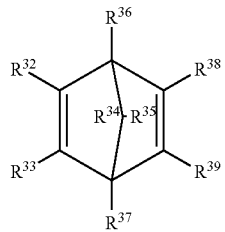

[6]

wherein $R^{32}$ to $R^{39}$ are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having 1 to 10 carbon atoms, and the above alkyl, alkoxy, alkoxycarbonyl, alkylthio and alkylsilyl groups may be substituted with a halogen atom or an aryl group.

Examples of the compound represented by the formula [6] are as follows:
bicyclo[2.2.1]-hepta-2,5-diene, 1-methylbicyclo[2.2.1]-hepta-2,5-diene, 1-ethylbicyclo[2.2.1]-hepta-2,5-diene, 1-butylbicyclo[2.2.1]-hepta-2,5-diene, 1-tert-butylbicyclo[2.2.1]-hepta-2,5-diene, 1,4-dimethylbicyclo[2.2.1]-hepta-2,5-diene, 1,4-dibutylbicyclo[2.2.1]-hepta-2,5-diene, 7,7-dimethylbicyclo[2.2.1]-hepta-2,5-diene, 7,7-dibutylbicyclo[2.2.1]-hepta-2,5-diene, 7,7-difluorobicyclo[2.2.1]-hepta-2,5-diene, and 7,7-dichlorobicyclo[2.2.1]-hepta-2,5-diene. Among them, still further preferred is bicyclo[2.2.1]-hepta-2,5-diene.

The monomer (B) in the present invention may be a compound known in the art. Examples of the monomer (B) are the following compounds, which may be used in combination of two or more thereof:
aliphatic diols such as 1,2-ethylene glycol, 1,3-propylene glycol, 1,4-butylene glycol, 1,5-pentylene glycol, 1,6-hexylene glycol, 1,8-octylene glycol, 1,10-decylene glycol, 1,11-undecylene glycol, 1,12-dodecylene glycol, 1,13-tridecylene glycol, 1,14-tetradecylene glycol, 1,15-pentadecylene glycol, 1,16-hexadecylene glycol, 1,17-heptadecylene glycol, 1,18-octadecylene glycol, 1,19-nonadecylene glycol, 1,20-eicosylene glycol, 2-methyl-1,3-propylene glycol, 3,3-dimethyl-1,5-pentylene glycol, 3-fluoro-1,6-hexylene glycol, 3,3-dichloro-1,6-hexylene glycol, 3,4,5-tribromo-1,6-hexylene glycol, 4-phenyl-1,7-heptylene glycol, 4-methoxy-1,7-heptylene glycol, 4-ethoxycarbonyl-1,8-octylene glycol, 4-propylthio-1,10-decylene glycol, 5-nitro-1,12-dodecylene glycol, 7-cyano-1,16-hexadecylene glycol, 8-ethylsilyl-1,18-octadecylene glycol, o-xylene glycol, m-xylene glycol, and p-xylene glycol; alicyclic diols such as 1,2-dihydroxycyclohexane, 1,3-dihydroxycyclohexane, and 1,4-dihydroxycyclohexane; and divalent phenols such as 1,2-dihydroxybenzene, 1,3-dihydroxybenzene, hydroquinone, 4,4'-biphenol, 9,9-bis(4-hydroxyphenyl)fluorene, bis(4-hydroxyphenyl)sulfone, bis(4-hydroxyphenyl)sulfide, and 2,2-bis(4-hydroxyphenyl)hexafluoropropane.

The metal salt (polymerization catalyst) in the present invention may be a metal salt known in the art. Examples of the metal salt are copper (II) sulfate, silver (I) sulfate, indium (III) sulfate, scandium (III) sulfate, ytterbium (III) sulfate, hafnium (IV) sulfate, zirconium (III) sulfate, copper (II) chloride, silver (I) chloride, indium (III) chloride, scandium (III) chloride, ytterbium (III) chloride, hafnium (IV) chloride, zirconium (III) chloride, copper (II) nitrate, silver (I) nitrate, indium (III) nitrate, scandium (III) nitrate, ytterbium (III) nitrate, hafnium (IV) nitrate, zirconium (III) nitrate, copper (II) methanesulfonate, silver (I) methanesulfonate, indium (III) methanesulfonate, scandium (III) methanesulfonate, ytterbium (III) methanesulfonate, hafnium (IV) methanesulfonate, zirconium (III) methanesulfonate, copper (II) trifluoromethanesulfonate, silver (I) trifluoromethanesulfonate, indium (III) trifluoromethanesulfonate, scandium (III) trifluoromethanesulfonate, ytterbium (III) trifluoromethanesulfonate, hafnium (IV) trifluoromethanesulfonate, and zirconium (III) trifluoromethanesulfonate.

Among them, preferred is a metal salt of trifluoromethanesulfonic acid such as copper (II) trifluoromethanesulfonate, silver (I) trifluoromethanesulfonate, indium (III) trifluoromethanesulfonate, scandium (III) trifluoromethanesulfonate, ytterbium (III) trifluoromethanesulfonate, hafnium (IV) trifluoromethanesulfonate, aluminum (III) trifluoromethanesulfonate, and zirconium trifluoromethanesulfonate (III); and more preferred is copper (II) trifluoromethanesulfonate or aluminum (III) trifluoromethanesulfonate.

Properties of the polyether polymer of the present invention depend largely on a chemical structure of the monomers (A) and (B). Since the polyether polymer of the present invention contains cyclic structures in its main chain derived from the monomer (A), the polyether polymer always has a highly hydrophobic property, whereas a commercially available polyether polymer such as polyoxyethylene consisting of a unit of —$CH_2CH_2$—O—, and polyoxypropylene consisting of a unit of —$CH(CH_3)CH_2$—O— has a highly hydrophilic property.

A copolymerization method of the monomers (A) and (B) in the production process of the present invention is not particularly limited. Examples of the copolymerization method are a bulk polymerization method and a solution or suspension polymerization method using a suitable polymerization solvent, those methods being batch-wise or continuous. The polymerization solvent is not particularly limited. The polymerization solvent is suitably determined according to a copolymerization temperature, and may be a commonly-used solvent. Preferable examples of the polymerization solvent are toluene, hexane, heptane, acetone, nitromethane, 1,4-dioxane, tetrahydrofuran, and propylene carbonate.

Respective concentrations of the monomers (A) and (B) in the production process of the present invention are not particularly limited, and are preferably 0.1 to 50 mol/L, and more preferably 0.5 to 30 mol/L. The monomers (A) and (B) are not particularly limited in their amount used, and are used preferably in an equimolecular amount.

A concentration of the metal salt in the production process of the present invention is not particularly limited, and is preferably $1\times10^{-8}$ g to 1 g, and further preferably $1\times10^{-7}$ g to $1\times10^{-1}$ g, per 1 mL of the total solvent in the polymerization system.

A copolymerization time in the production process of the present invention is not particularly limited. It is suitably determined according to a ratio of used amounts of the monomers (A) and (B), and a structure of a polymerization reactor, and is usually 10 minutes to 40 hours, and preferably 10 minutes to 24 hours.

A copolymerization temperature in the production process of the present invention is not particularly limited, and is preferably 0 to 150° C., more preferably 30 to 120° C., and further preferably 70 to 1050° C.

The present invention is explained with reference to the following Examples, which do not limit the scope of the present invention.

EXAMPLE 1

There was charged 4 mL of purified 1,4-dioxane as a polymerization solvent with a syringe into a thoroughly dried 25 mL glass reaction tube under an ordinary pressure and atmosphere of a nitrogen gas at a room temperature, the reaction tube being fixed on a multiple reaction carousel apparatus manufactured by Radleys Discovery Technologies, on which apparatus twelve reaction tubes can be fixed. To the reaction tube, 4 mL of a suspension (concentration: 0.025 g/mL) of copper (II) trifluoromethanesulfonate (metal salt) in 1,4-dioxane was added, and the resultant mixture was stirred. To the mixture, 0.56 mL ($5.5\times10^{-3}$ mol) of bicyclo[2.2.1]-hepta-2,5-diene (monomer (A)) manufactured by Tokyo Chemical Industry Co., Ltd., and 0.76 g ($5.5\times10^{-3}$ mol) of p-xylene glycol (monomer (B)) manufactured by Tokyo Chemical Industry Co., Ltd. were added. The reaction tube was stoppered tightly, and the mixture was heated up to 90° C. to copolymerize the monomers (A) and (B) at 90° C. for 7 hours, thereby obtaining a polymerization reaction mixture.

An aqueous solution of sodium hydrogen carbonate having a concentration of 1.0 mol/L was added to the polymerization reaction mixture to wash the polymerization reaction mixture, and then the resultant mixture was separated into an oil layer and an aqueous layer. Sodium hydrogen sulfate was added to the oil later to dry the oil later. A small amount of methanol was added to the dried oil later, thereby precipitating a solid. The solid was filtered off, and the separated solid was dried under a reduced pressure at 80° C. for about 3 hours, thereby obtaining 0.62 g of a dried product.

The dried product was measured according to a $^1$H-NMR method using a $^1$H-NMR apparatus, LA-500, manufactured by JEOL LTD, under the following conditions, thereby observing a peak (i) at 3.2 to 4.8 ppm, plural peaks (ii) at 1.0 to 2.8 ppm, and a peak (iii) at 6.8 to 7.6 ppm, the peak (i) being assigned to a hydrogen atom linked with a carbon atom situated next to an oxygen atom of an ether bond in a main chain of a polyether, the plural peaks (ii) being assigned to a 2,5-bicyclo[2.2.1]heptylene structure derived from the monomer (A), and the peak (iii) being assigned to a hydrogen atom linked with a benzene ring in the monomer (B):

measurement solvent of chloroform-$d_1$;
measurement temperature of room temperature;
sample concentration of 50 mg-sample/0.5 mL-solution; and
reference material of chloroform-$d_1$ (7.26 ppm).

The above $^1$H-NMR peaks (i), (ii) and (iii) resulted in a conclusion that the above obtained dried product was a polyether polymer of bicyclo[2.2.1]hepta-2,5-diene (monomer (A)) and p-xylene glycol (monomer (B)), poly[oxy-2,5-biyclo[2.2.1]heptylene-oxy-1,4-xylylene]. The polyether polymer was found to have a weight-average molecular weight (Mw) of $1.17\times10^3$ and $7.8\times10^2$ (namely, bimodality) in terms of weight-average molecular weights of standard polystyrenes.

The above weight-average molecular weight (Mw), and the hereinafter-mentioned number-average molecular weight (Mn) and molecular weight distribution (Mw/Mn) were measured according to a gel permeation chromatography (GPC) under the following conditions using an equipment manufactured by JASCO Corporation having a degasser (DG-980-50), a pump (PU-980), an auto-sampler (AS-950), a column oven (CO-966), an RI detector (RI-930) and a UV detector (UV-975), with a calibration curve prepared using standard polystyrenes:

column, SHODEX KF-804, manufactured by Showa Denko K.K.;
measurement temperature of 40° C.;
solvent of chloroform; and
sample concentration of 1 mg-sample/mL-solution.

EXAMPLE 2

Example 1 was repeated except that p-xylene glycol (monomer (B)) was changed to 0.65 g ($5.5\times10^{-3}$ mol) of 1,6-hexylene glycol manufactured by Tokyo Chemical Industry Co., Ltd., thereby obtaining a dried product.

The dried product was similarly measured according to a $^1$H-NMR method, thereby observing a peak (i) at 3.2 to 3.8 ppm, and plural peaks (ii) redundantly at 1.0 to 2.8 ppm, the peak (i) being assigned to a hydrogen atom linked with a carbon atom situated next to an oxygen atom of an ether bond in a main chain of a polyether polymer, and the plural peaks (ii) being assigned to a 2,5-bicyclo[2.2.1]heptylene structure derived from the monomer (A) and a hexylene structure derived from the monomer (B). Those $^1$H-NMR peaks (i) and (ii) resulted in a conclusion that the above obtained dried product was a polyether polymer of bicyclo[2.2.1]hepta-2,5-diene (monomer (A)) and 1,6-hexylene glycol (monomer (B)), poly[oxy-2,5-biyclo[2.2.1]heptylene-oxy-hexylene]. The polyether polymer was found to have a weight-average molecular weight (Mw) of $1.47 \times 10^3$ and $1.07 \times 10^3$ (namely, bimodality) in terms of weight-average molecular weights of standard polystyrenes.

EXAMPLE 3

Example 1 was repeated except that (1) the amount of the monomer (A) was changed from 0.56 mL ($5.5 \times 10^{-3}$ mol) to 0.43 mL ($4.2 \times 10^{-3}$ mol), (2) the amount of the monomer (B) was changed from 0.76 mL ($5.5 \times 10^{-3}$ mol) to 0.58 g ($4.2 \times 10^{-3}$ mol), (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 0.55 g of a dried product.

The dried product was similarly measured according to a $^1$H-NMR method, thereby observing a peak (i) at 3.2 to 4.8 ppm, a peak (ii) at 6.8 to 7.6 ppm, and plural peaks (iii) at 1.0 to 2.8 ppm, the peak (i) being assigned to a hydrogen atom linked with a carbon atom situated next to an oxygen atom of an ether bond in a main chain of a polyether polymer, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether polymer of bicyclo[2.2.1]hepta-2,5-diene (monomer (A)) and p-xylene glycol (monomer (B)), poly[oxy-2,5-biyclo[2.2.1]heptylene-oxy-1,4-xylylene]. The polyether showed a monomodal peak in a GPC measurement, and had a number-average molecular weight (Mn) of $8.34 \times 10^3$; a weight-average molecular weight (Mw) of $1.46 \times 10^4$; and a molecular weight distribution (Mw/Mn) of 1.76.

EXAMPLE 4

Example 1 was repeated except that (1) the amount of the monomer (A) was changed from 0.56 mL ($5.5 \times 10^{-3}$ mol) to 0.43 mL ($4.2 \times 10^{-3}$ mol), (2) the monomer (B) was changed to 0.46 g ($4.2 \times 10^{-3}$ mol) of hydroquinone manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 0.12 g of a dried product.

The dried product was similarly measured according to a $^1$H-NMR method, thereby observing a peak (i) at 4.0 to 5.1 ppm, a peak (ii) at 6.2 to 7.0 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether polymer of bicyclo[2.2.1]hepta-2,5-diene (monomer (A)) and hydroquinone (monomer (B)), poly[oxy-2,5-biyclo[2.2.1]heptylene-oxy-1,4-phenylene]. The polyether showed a monomodal peak in a GPC measurement, and had a number-average molecular weight (Mn) of $5.49 \times 10^3$; a weight-average molecular weight (Mw) of $6.87 \times 10^3$; and a molecular weight distribution (Mw/Mn) of 1.25.

EXAMPLE 5

Example 1 was repeated except that (1) the amount of the monomer (A) was changed from 0.56 mL ($5.5 \times 10^{-3}$ mol) to 0.43 mL ($4.2 \times 10^{-3}$ mol), (2) the monomer (B) was changed to 0.79 g ($4.2 \times 10^{-3}$ mol) of 4,4'-biphenol manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 0.37 g of a dried product.

The dried product was similarly measured according to a $^1$H-NMR method, thereby observing a peak (i) at 4.0 to 5.1 ppm, a peak (ii) at 6.6 to 7.7 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to 2,5-bicyclo[2.2.1]heptylene structure derived from the monomer (A). Those $^1$H-NMR peaks (i), (ii) and (iii) resulted in a conclusion that the above obtained dried product was a polyether of bicyclo[2.2.1]-hepta-2,5-diene (monomer (A)) and 4,4'-biphenol (monomer (B)), poly[oxy-2,5-biyclo[2.2.1]heptylene-oxy-biphenyl-4,4'-diyl]. The polyether showed a monomodal peak in a GPC measurement, and had a number-average molecular weight (Mn) of $4.10 \times 10^3$; a weight-average molecular weight (Mw) of $5.26 \times 10^3$; and a molecular weight distribution (Mw/Mn) of 1.28.

EXAMPLE 6

Example 1 was repeated except that (1) the amount of the monomer (A) was changed from 0.56 mL ($5.5 \times 10^{-3}$ mol) to 0.86 mL ($8.5 \times 10^{-3}$ mol), (2) the monomer (B) was changed to 2.96 g ($8.5 \times 10^{-3}$ mol) of 9,9-bis(4-hydroxyphenyl)fluorene manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 2.32 g of a dried product.

The dried product was similarly measured according to a $^1$H-NMR method, thereby observing a peak (i) at 3.8 to 5.3 ppm, a peak (ii) at 6.3 to 7.8 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether of bicyclo[2.2.1]-hepta-2,5-diene (monomer (A)) and 9,9-bis(4-hydroxyphenyl)fluorene (monomer (B)), poly[oxy-2,5-biyclo[2.2.1]heptylene-oxy-fluorene-9,9-bis(1,4-phenylene)]. The polyether showed a monomodal peak in a GPC measurement, and had a number-average molecular weight (Mn) of $2.79 \times 10^3$; a weight-average molecular weight (Mw) of $4.49 \times 10^3$; and a molecular weight distribution (Mw/Mn) of 1.61.

EXAMPLE 7

Example 1 was repeated except that (1) the amount of the monomer (A) was changed from 0.56 mL ($5.5 \times 10^{-3}$ mol) to 0.86 mL ($8.5 \times 10^{-3}$ mol), (2) the monomer (B) was changed to 2.11 g ($8.5 \times 10^{-3}$ mol) of 4,4'-biphenol manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 0.08 g of a dried product.

The dried product was similarly measured according to a $^1$H-NMR method, thereby observing a peak (i) at 3.8 to 5.3 ppm, a peak (ii) at 6.5 to 7.9 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether of bicyclo[2.2.1]-hepta-2,5-diene (monomer (A)) and 4,4'-biphenol (monomer (B)), poly[oxy-2,5-biyclo[2.2.1]heptylene-oxy-4,4'-sulfonyldiphenylene]. The polyether showed a monomodal peak in a GPC measurement, and had a number-average molecular weight (Mn) of $1.91 \times 10^3$; a weight-average molecular weight (Mw) of $3.16 \times 10^3$; and a molecular weight distribution (Mw/Mn) of 1.65.

EXAMPLE 8

Example 1 was repeated except that (1) the amount of the monomer (A) was changed from 0.56 mL ($5.5 \times 10^{-3}$ mol) to 0.86 mL ($8.5 \times 10^{-3}$ mol), (2) the monomer (B) was changed to 1.84 g ($8.5 \times 10^{-3}$ mol) of bis(4-hydroxyphenyl)sulfide manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 70° C., and (6) the polymerization time was changed from 7 hours to 4 hours, thereby obtaining 1.34 g of a dried product.

The dried product was similarly measured according to a $^1$H-NMR method, thereby observing a peak (i) at 3.8 to 5.3 ppm, a peak (ii) at 6.3 to 7.4 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether of bicyclo[2.2.1]-hepta-2,5-diene (monomer (A)) and bis(4-hydroxyphenyl)sulfide (monomer (B)), poly[oxy-2,5-biyclo[2.2.1]heptylene-oxy-4,4'-thiodiphenylene]. The polyether showed a monomodal peak in a GPC measurement, and had a number-average molecular weight (Mn) of $2.49 \times 10^2$; a weight-average molecular weight (Mw) of $2.60 \times 10^3$; and a molecular weight distribution (Mw/Mn) of 1.05.

EXAMPLE 9

Example 1 was repeated except that (1) the amount of the monomer (A) was changed from 0.56 mL ($5.5 \times 10^{-3}$ mol) to 0.43 mL ($4.2 \times 10^{-3}$ mol), (2) the monomer (B) was changed to 1.70 g ($4.2 \times 10^{-3}$ mol) of 2,2-bis(4-hydroxyphenyl)hexafluoropropane manufactured by Tokyo Chemical Industry Co., Ltd., (3) the metal salt was changed to 0.05 g of aluminum trifluoromethanesulfonate manufactured by Aldrich, (4) the polymerization solvent was changed to 17 mL of propylene carbonate manufactured by Aldrich, (5) the polymerization temperature was changed from 90° C. to 80° C., and (6) the polymerization time was changed from 7 hours to 20 hours, thereby obtaining 0.38 g of a dried product.

The dried product was similarly measured according to a $^1$H-NMR method, thereby observing a peak (i) at 4.0 to 5.1 ppm, a peak (ii) at 6.4 to 7.4 ppm, and plural peaks (iii) at 1.0 to 2.8 ppm, the peak (i) being assigned to a hydrogen atom linked with a carbon atom situated next to an oxygen atom of an ether bond in a main chain of a polyether, the peak (ii) being assigned to a hydrogen atom linked with a benzene ring in the monomer (B), and the plural peaks (iii) being assigned to a 2,5-bicyclo[2.2.1]heptylene structure derived from the monomer (A). Those $^1$H-NMR peaks (i), (ii) and (iii) resulted in a conclusion that the above obtained dried product was a polyether of bicyclo[2.2.1]-hepta-2,5-diene (monomer (A)) and 2,2-bis(4-hydroxyphenyl)hexafluoropropane (monomer (B)), poly[oxy-2,5-biyclo[2.2.1]heptylene-oxy-hexafluoropropane-2,2-bis(1,4-phenylene)]. The polyether showed a monomodal peak in a GPC measurement, and had a number-average molecular weight (Mn) of $6.34 \times 10^3$; a weight-average molecular weight (Mw) of $8.10 \times 10^3$; and a molecular weight distribution (Mw/Mn) of 1.28.

INDUSTRIAL APPLICABILITY

Since the polyether polymer of the present invention has cyclic structures in its main chain, the polyether can be applied to various uses such as high refractive index-carrying materials, and ion-conducting materials. Particularly, by taking advantage of a highly hydrophobic property of the polyether of the present invention, the polyether can be utilized in various fields different from fields, which utilize polyoxyethylene or polyoxypropylene having a highly hydrophilic property.

The invention claimed is:
1. A polyether polymer comprising polymerization units represented by the following formula [1]:

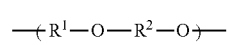

[1]

wherein, regarding $R^1$, (1) $R^1$ is a group of a mono-cyclic structure having a cyclic skeleton containing 6 to 20 atoms, two or more of which are carbon atoms, or is a group of a structure formed by a mutual linking of plurality of a mono-cyclic structure having a cyclic skeleton containing 3 to 20 atoms, two or more of which are carbon atoms, (2) two carbon atoms, which are contained in one or more of the cyclic skeletons of $R^1$, and do not exist next to each other, make a bond to an oxygen atom of an ether bond in a main chain next to $R^1$, respectively, (3) when an oxygen atom exists in one or more of the cyclic skeletons of $R^1$, said oxygen atom makes no bond to any of the above two carbon atoms mentioned in (2), and (4) two atoms, which are contained in one or more of the cyclic skeletons of $R^1$, and do not exist next to each other, may make a bond to each other directly or through an atom or an atomic group; and $R^2$ is an aliphatic hydrocarbyl group having 2 to 20 carbon atoms, an alicyclic hydrocarbyl group having 4 to 20 carbon atoms, or an aromatic hydrocarbyl group having 6 to 30 carbon atoms, excluding a 2,2-diphenylpropane-4,4'-diyl group; and wherein the polyether polymer has a primary structure which is formed by alternate linking of a divalent group of $R^1$ with a divalent group of $R^2$ through an ether bond.

2. The polyether polymer according to claim 1, wherein $R^1$ is an aliphatic monocyclic hydrocarbyl group having a $C_{6-20}$ carbocyclic skeleton, or is a group of a structure formed by a mutual linking of plurality of a mono-cyclic structure of an alicyclic hydrocarbon having a $C_{3-20}$ cyclic skeleton.

3. The polyether polymer according to claim 1, wherein $R^1$ is an alicyclic hydrocarbyl group represented by the following formula [2] or [3]:

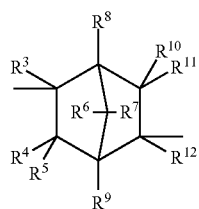

[2]

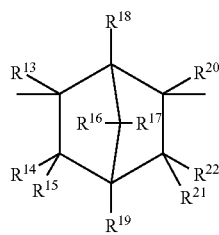

[3]

wherein $R^3$ to $R^{12}$ in the formula [2] and $R^{13}$ to $R^{22}$ in the formula [3] are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having 1 to 10 carbon atoms, and the above alkyl, alkoxy, alkoxycarbonyl, alkylthio and alkylsilyl groups may be substituted with a halogen atom or an aryl group.

4. The polyether polymer according to claim 1, wherein $R^1$ is a 2,5-bicyclo[2.2.1]heptylene group or a 2,6-bicyclo[2.2.1] heptylene group.

5. A process for producing a polyether polymer comprising polymerization units represented by the following formula [1], comprising the step of copolymerizing one or more kinds of the following monomer (A) with one or more kinds of the following monomer (B) in the presence of a metal salt:

(A) a non-conjugated mono-cyclic diene compound (A1) containing a cyclic skeleton containing 6 to 20 atoms, two or more of which are carbon atoms, and/or a non-conjugated cyclic diene compound (A2) containing a mutual linking of plurality of a mono-cyclic structure having a cyclic skeleton containing 3 to 20 atoms, two or more of which are carbon atoms; and (B) one or more kinds of compounds selected from the group consisting of an aliphatic diol having 2 to 20 carbon atoms, two of which carbon atoms have a hydroxyl group, respectively, an alicyclic diol having 3 to 20 carbon atoms, and a divalent phenol;

[1]

wherein, regarding $R^1$, (1) $R^1$ is a group of a mono-cyclic structure having a cyclic skeleton containing 6 to 20 atoms, two or more of which are carbon atoms, or is a group of a structure formed by a mutual linking of plurality of a mono-cyclic structure having a cyclic skeleton containing 3 to 20 atoms, two or more of which are carbon atoms, (2) two carbon atoms, which are contained in one or more of the cyclic skeletons of $R^1$, and do not exist next to each other, make a bond to an oxygen atom of an ether bond in a main chain next to $R^1$, respectively, (3) when an oxygen atom exists in one or more of the cyclic skeletons of $R^1$, said oxygen atom makes no bond to any of the above two carbon atoms mentioned in (2), and (4) two atoms, which are contained in one or more of the cyclic skeletons of $R^1$, and do not exist next to each other, may make a bond to each other directly or through an atom or an atomic group; and $R^2$ is an aliphatic hydrocarbyl group having 2 to 20 carbon atoms, an alicyclic hydrocarbyl group having 4 to 20 carbon atoms, or an aromatic hydrocarbyl group having 6 to 30 carbon atoms, excluding a 2,2-diphenylpropane-4,4'-diyl group.

6. The process for producing a polyether polymer according to claim 5, wherein the monomer (A) is a compound represented by the following formula [4] or [5]:

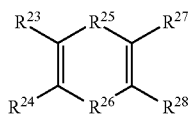

[4]

wherein $R^{23}$, $R^{24}$, $R^{27}$ and $R^{28}$ are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having 1 to 10 carbon atoms, and the above alkyl, alkoxy, alkoxycarbonyl, alkylthio and alkylsilyl groups may be substituted with a halogen atom or an aryl group; $R^{25}$ and $R^{26}$ are independently of each other a hydrocabyl group having 1 or more carbon atoms, which may have a substituent; the number of the atoms contained in the cyclic skeleton consisting of $R^{25}$, $R^{26}$ and four carbon atoms between $R^{25}$ and $R^{26}$ is 6 to 20; and $R^{25}$ and $R^{26}$ may be linked with each other directly or through an atom or an atomic group, or

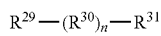

[5]

wherein $R^{29}$ and $R^{31}$ are independently of each other a cyclic hydrocarbyl group having (i) a cyclic skeleton consisting of 3 to 20 atoms, two or more atoms of those 3 to 20 atoms being carbon atoms, (ii) one carbon-to-carbon double bond, and (iii) an optional substituent; $R^{30}$ is a cross-linking group containing two or more atoms selected from the group consisting of a carbon atom, a hydrogen atom and a nitrogen atom; and n is a number of 0 or 1.

7. The process for producing a polyether polymer according to claim 5, wherein the monomer (A) is a compound represented by the following formula [6]:

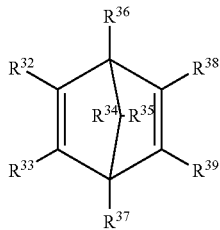

[6]

wherein $R^{32}$ to $R^{39}$ are independently of one another a hydrogen atom, an alkyl group having 1 to 10 carbon atoms, an aryl group having 6 to 18 carbon atoms, an alkoxy group having 1 to 10 carbon atoms, an alkoxycarbonyl group having 1 to 10 carbon atoms, an alkylthio group having 1 to 10 carbon atoms, an arylthio group having 6 to 18 carbon atoms, a nitro group, a cyano group, a halogen group, or an alkylsilyl group having 1 to 10 carbon atoms, and the above alkyl, alkoxy, alkoxycarbonyl, alkylthio and alkylsilyl groups may be substituted with a halogen atom or an aryl group.

8. The process for producing a polyether polymer according to claim 5, wherein the monomer (A) is bicyclo[2.2.1]-hepta-2,5-diene.

9. The process for producing a polyether polymer according to claim 5, wherein the metal salt is a metal salt of trifluoromethanesulfonic acid.

10. The polyether polymer according to claim 1, wherein the polyether polymer has a weight-average molecular weight of $7.8 \times 10^2$ or more.

* * * * *